(12) United States Patent
Gutsell

(10) Patent No.: US 11,565,254 B2
(45) Date of Patent: Jan. 31, 2023

(54) FLUID MANIPULATION CARTRIDGE AND CONTROLLER MECHANISM

(71) Applicant: GSG TECHNOLOGY LTD, Cambridge (GB)

(72) Inventor: Graham Gutsell, Cambridge (GB)

(73) Assignee: GSG Technology LTD., Cambridge (GB)

( * ) Notice: Subject to any disclaimer, the term of this patent is extended or adjusted under 35 U.S.C. 154(b) by 460 days.

(21) Appl. No.: 16/475,492

(22) PCT Filed: Jan. 9, 2018

(86) PCT No.: PCT/GB2018/050049
§ 371 (c)(1),
(2) Date: Jul. 2, 2019

(87) PCT Pub. No.: WO2018/127714
PCT Pub. Date: Jul. 12, 2018

(65) Prior Publication Data
US 2019/0336972 A1     Nov. 7, 2019

(30) Foreign Application Priority Data

Jan. 9, 2017 (GB) .................................... 1700340

(51) Int. Cl.
*B01L 3/00* (2006.01)
*B01L 7/00* (2006.01)
*G01N 1/02* (2006.01)
*G01N 1/28* (2006.01)

(52) U.S. Cl.
CPC ....... *B01L 3/502738* (2013.01); *B01L 3/5029* (2013.01); *B01L 3/50273* (2013.01); *B01L 7/00* (2013.01); *G01N 1/02* (2013.01); *G01N 1/28* (2013.01); *B01L 2200/0605* (2013.01); *B01L 2200/0621* (2013.01); *B01L 2200/0642* (2013.01); *B01L 2200/0689* (2013.01); *B01L 2300/042* (2013.01); *B01L 2300/044* (2013.01); *B01L 2300/047* (2013.01); *B01L 2300/048* (2013.01); *B01L 2300/0627* (2013.01); *B01L 2300/0672* (2013.01); *B01L 2300/087* (2013.01); *B01L 2300/0816* (2013.01); *B01L 2300/0864* (2013.01); *B01L 2300/123* (2013.01); *B01L 2300/18* (2013.01); *B01L 2400/0487* (2013.01); *B01L 2400/0638* (2013.01); *B01L 2400/0666* (2013.01); *G01N 2001/028* (2013.01)

(58) Field of Classification Search
CPC ....... B01L 2300/0816; B01L 2300/087; B01L 2400/0638; G01N 1/28; G01N 2001/028
USPC ........................................ 422/554, 550, 552
See application file for complete search history.

(56) References Cited

U.S. PATENT DOCUMENTS

| 5,393,496 | A | 2/1995 | Seymour |
| 2001/0036672 | A1 | 11/2001 | Anderson et al. |
| 2008/0260581 | A1 | 10/2008 | Rosman et al. |
| 2012/0288924 | A1* | 11/2012 | Peterson ............... C12Q 1/6844 422/68.1 |
| 2013/0230906 | A1 | 9/2013 | Martinelli et al. |
| 2013/0331298 | A1 | 12/2013 | Rea |
| 2016/0001286 | A1 | 1/2016 | Ettlin |

FOREIGN PATENT DOCUMENTS

| EP | 1167968 A1 | 1/2002 |
| WO | 0187486 A2 | 11/2001 |
| WO | 20090108260 A2 | 9/2009 |

OTHER PUBLICATIONS

International Search Report for International Application No. PCT/GB2018/050049, dated Jun. 11, 2018 (7 pages).

\* cited by examiner

*Primary Examiner* — Natalia Levkovich
(74) *Attorney, Agent, or Firm* — Kagan Binder, PLLC

(57) ABSTRACT

There is provided a sample processing cartridge comprising a. a sample entry location; b. a closed sample processing chamber; c. a sample analysis location comprising a sample analysis well; d. a first channel fluidly connecting the sample entry location and the sample processing chamber; e. a second channel connecting the sample analysis location and the sample processing chamber, the second channel comprising a closed or closable second channel valve; wherein the sample processing chamber comprises a second channel port providing fluid connection between the second channel and the sample processing chamber, the second channel port being positioned in a sample accumulating region of the sample processing chamber. There is also provided a sample processing system comprising the cartridge, and methods of use of the cartridge and processing system in a sample processing assay.

18 Claims, 20 Drawing Sheets

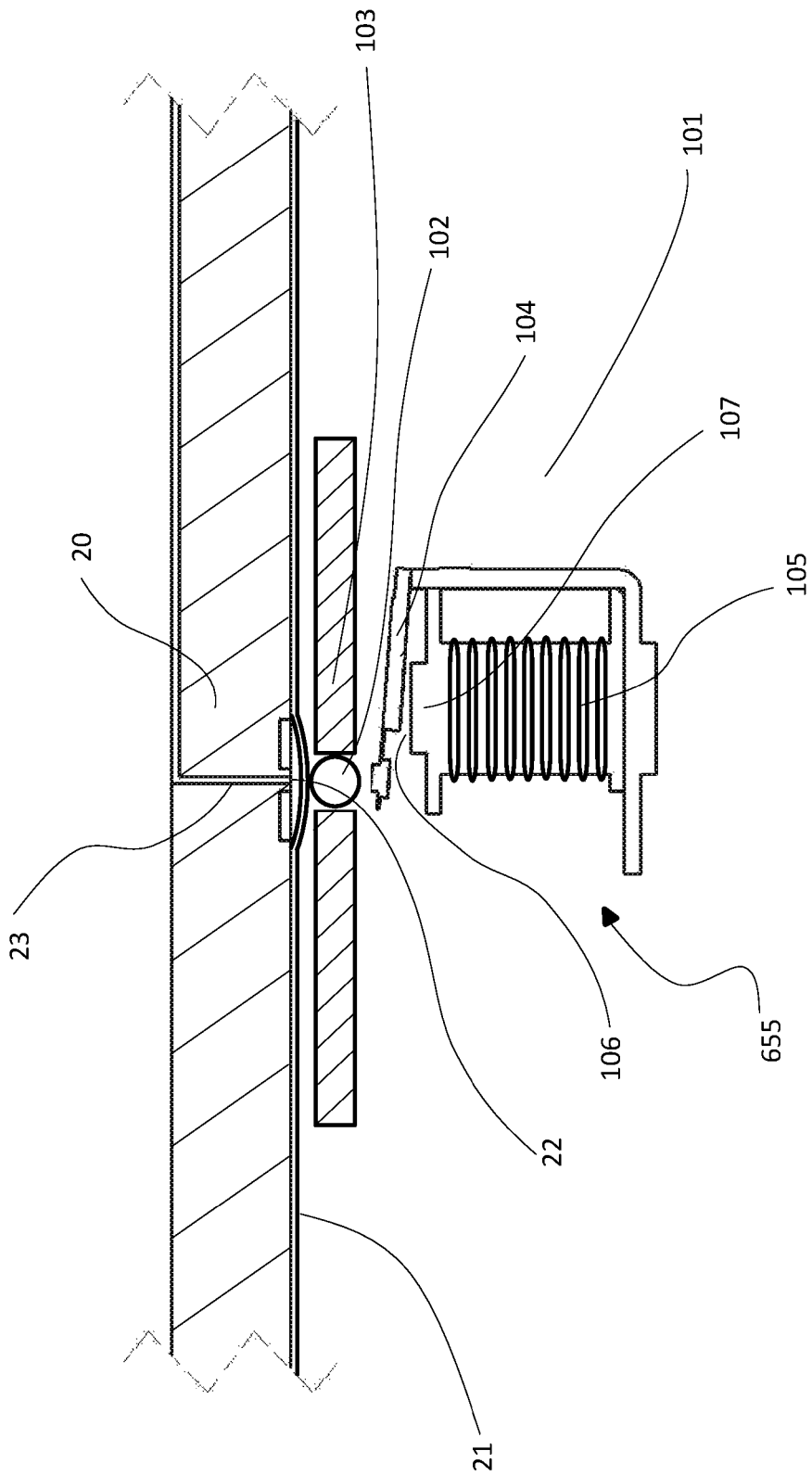

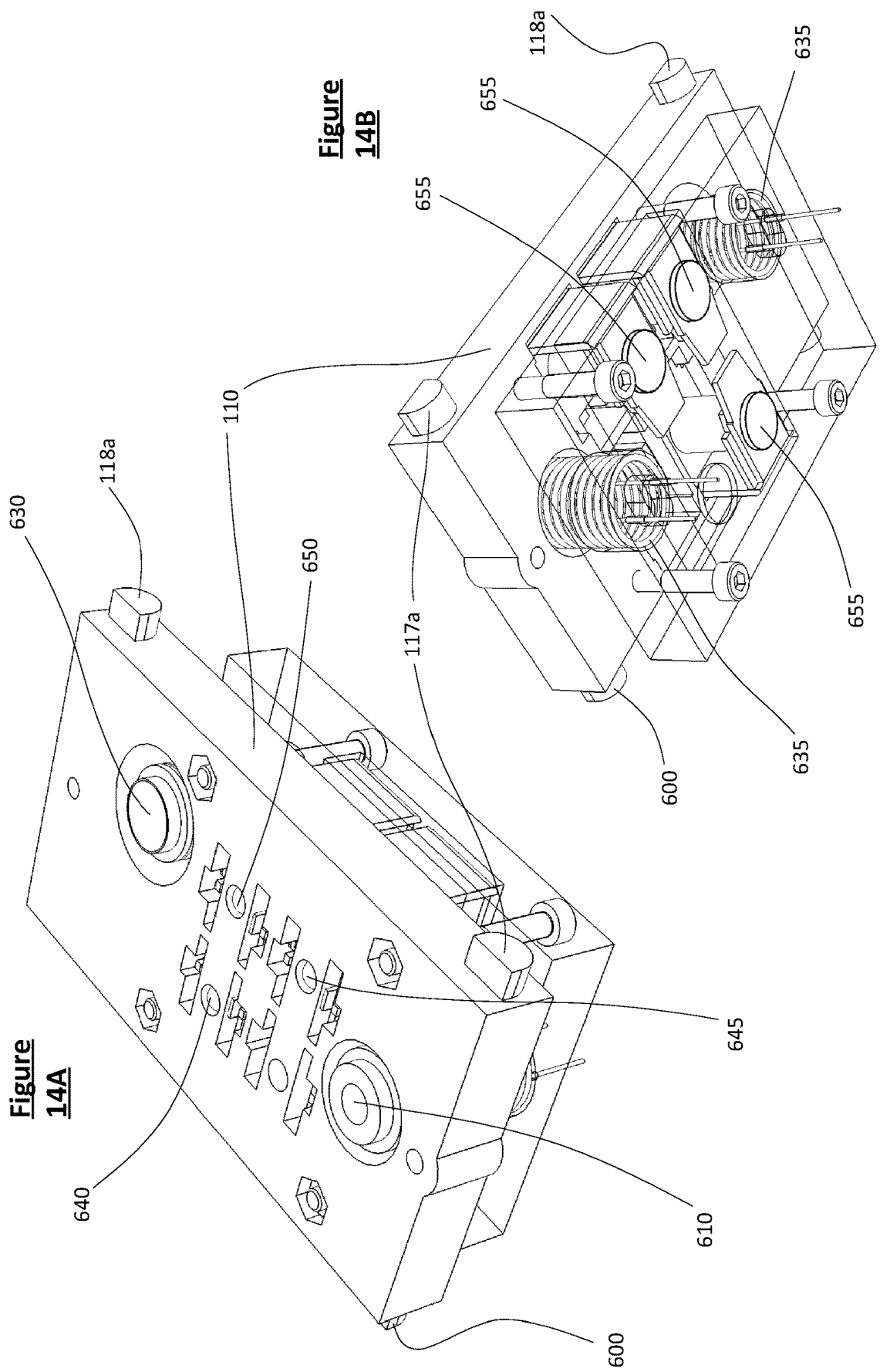

FLUID MANIPULATION CARTRIDGE AND CONTROLLER MECHANISM

FIELD OF THE INVENTION

The field of the current invention is that of fluid manipulation devices, used for example, in diagnostic tests.

BACKGROUND

The current inventor is co-inventor of a simple device, described in WO2011/051735 consisting of a disposable test cartridge for use with a control unit in performing a molecular DNA test. That device is designed to be cheap, simple and easy to use with little or no training. However, it requires the user to perform some preparatory sample manipulation steps, which would require some expertise on the user's part and certain modest laboratory facilities.

It is clearly advantageous if these sample preparation steps can be incorporated on the test cartridge itself, without complicating the device unnecessarily or significantly increasing its manufacturing cost.

An example of a disposable test cartridge that incorporates a sample preparation and molecular diagnostic test is provided in WO2015/015176, WO2015/015180 and WO2015/015181. These documents disclose various devices including various valves and fluid reservoirs. These are designed to be operated in certain specific ways involving, for example, mechanical actuators and the use of compressed air.

The inventor has also filed GB2512141 that discloses an encapsulation system specifically intended to protect moisture sensitive reagents that may be used in devices such as those described. The present invention incorporates and builds upon the features there disclosed.

SUMMARY OF INVENTION

The present invention seeks to provide improved solutions to those disclosed in similar and related applications by incorporating sample preparation and diagnostic testing implemented in a very simple cartridge and operated by an associated simple control unit.

The present disclosure describes a fluid manipulation cartridge comprising a chain of fluidically connected fluid control features including voids, wells, chambers, reservoirs, holes, passages, channels and the like, such that a volume of liquid located at an initial position within said chain of fluid control features can be displaced under the action of the differential pressure between air enclosed in upstream and downstream regions of the chain, until the volume, and/or aliquots therefrom, have been displaced to a configuration of one or more destination position(s).

Within the chain of fluid control features, a volume of liquid, suspension or other fluid may be displaced along a channel by the described means, causing it to fill a void such that an aliquot is retained in the void whilst the remainder of the volume is displaced further along the channel. The aliquot may be a volume of interest and retained in the void in order to include it in some subsequent process or analysis.

The or each void may comprise one or more internal walls within which various inlet and outlet ports may open. The port openings may further be within portions of the wall that are arranged to control the meniscus of liquid entering or collecting into the void, the meniscus rising as the volume of liquid so increases. The features may contain edges to break up the growth, spread or development of menisci. The features may also be at different levels relative to a rising meniscus such that a headspace of air can deliberately be trapped above it. The features may also have locally angled faces, especially where they are associated with outlet ports, to encourage the passage of air from an inlet port through any such headspace to an outlet port where the passage of air can disrupt and breaks through a meniscus. Such action is advantageous where it is important to control the volume of collected liquid and in order to make it repeatable from one run to another or from one device to another.

The chain of features may be a linear arrangement, resembling a chain or string of features; alternatively it may be branched at one or more points (forming a junction), resembling a "Y" shape or tree structure, for example. An individual chain of features as disclosed here is, however, unlikely to contain any loops and hence is not described as a network, web, grid or circuit.

The cartridge may comprise one or more of said chains. Furthermore they may be interlinked such that liquid at the destination position within one chain may constitute liquid at the initial position of another chain, and so forth.

The cartridge may be a molecular diagnostic or immuno-diagnostic device.

It may further be used for a sample preparation process for a molecular diagnostic or immunodiagnostic device where the detection system may be one of various different types, including for example, a lateral flow strip or an optical, electro-resistive or electro-chemical sensor or detection system.

Any of the above-described features may independently or concurrently form features of aspects of the invention as described in more detail below.

Therefore, according to a first aspect of the invention there is provided a sample processing cartridge comprising
  (a) a sample entry location;
  (b) a closed sample processing chamber;
  (c) a sample analysis location comprising a sample analysis well;
  (d) a first channel fluidly connecting the sample entry location and the sample processing chamber;
  (e) a second channel connecting the sample processing chamber and the sample analysis location, the second channel comprising a closed or closable second channel valve;
wherein the sample processing chamber comprises a second channel port providing fluid connection between the second channel and the sample processing chamber, the second channel port being positioned in a sample accumulating region of the sample processing chamber.

Throughout this specification, any mention of a first and second element, such as a chamber and a channel, being connected and/or being in flow communication and/or being fluidly connected, may encompass a direct connection, wherein the first and second element are not separated by any other feature, or indirect connection, wherein the first and second element are separated by at least one further element in flow communication with both of the first and second elements. Either eventuality is encompassed unless explicitly excluded.

The "sample accumulating region" is the region of the sample processing chamber in which liquid initial sample first starts to accumulate when entering the chamber from the first channel. For example, the sample processing chamber may be arranged substantially vertically, such that liquid entering the chamber may descend under gravity to a lower region of the well. In this case the second channel port may be located at or close to the lower region of the well, or may be an opening to a tube, for example, extending downwardly into the sample processing chamber so that the opening is at or close to the lower region of the well. (Non-limiting examples of such arrangements are shown in FIGS. 8 and 9B herein.)

However, in some embodiments, the sample processing chamber may have small dimensions such that surface tension forces become significant, with the effect that a liquid may be hindered from descending under gravity by the opposing forces of surface tension. For example, the chamber may take the form of a channel or tunnel along which liquid flows, completely filling the cross-section of the chamber with no void of air above it. In such cases, the second channel port need not be positioned at or close to the bottom of the chamber, but may be located in any region of the chamber in which initial sample first accumulates on entry to the chamber. In this case, it may often be convenient for the second channel port to be fluidly connected to a first junction which is itself fluidly connected to the first channel, so that sample enters the well from the first channel via the first junction and the second channel port, i.e. the second channel port is the entrance route into the chamber for initial sample, as well as the exit route from it for analytic sample.

The sample processing chamber may comprise more than one well, sub-chamber, void, reservoir, hole, passage, or channel, such that the sample processing chamber may form a series or network of, for example, wells linked by channels. However, the overall sample processing chamber is "closed" in that the only route through which analytic sample may exit the chamber is from the sample accumulating region.

The terms "initial sample" and "analytic sample" are defined below.

Therefore, as described herein, analytic sample may only leave the sample processing chamber from the sample accumulating region. Liquid initial sample may optionally enter the sample processing chamber via the sample accumulating region. Critically, when a liquid is proceeding into the chamber, it is not possible for liquid or gas to exit the chamber. Where the first junction and the second channel port is the route of entry for the initial sample, as well as the route of exit for the analytic sample, this is because there is no exit route which does not involve passage through the first junction. Alternatively, where initial sample enters the chamber directly from the first channel, the desired effect may be achieved by preventing liquid egress via the second channel port, typically by providing the second channel valve in a closed configuration. In any embodiment, when the cartridge is in use, the second channel valve is initially closed.

The chamber therefore does not comprise any route, other than the sample accumulating region, through which analytic sample or a gas such as air may exit the chamber. This may mean that there are no apertures, ports or channels extending from the chamber, other than those positioned in the sample accumulating region. In some embodiments, the second channel port is the only entrance to or exit from the chamber. In all arrangements, the invention provides the possibility for the generation of a volume of compressed air when a sample is introduced into the chamber, since the volume of air contained in the chamber prior to sample entry is not capable of escape from the chamber.

Advantageously, therefore, the arrangement of features described above has the result that application of a sample to the sample entry location of the cartridge and the urging of the sample into the sample processing chamber via the first channel causes an accumulation of pressure in the sample processing chamber, since air already present in the interior of the chamber prior to use cannot escape the closed sample processing chamber. In embodiments of the device, other features of the cartridge can be arranged, as described herein, to facilitate at least some of the subsequent movement of the sample to other locations in the cartridge, under the influence of the pressure generated in the closed sample processing chamber when the sample is first introduced into the device. This carries the advantage that initial user-facilitated steps, such as the closing of a lid, are effective to store energy within the system in the form of a compressed gas (typically air) to facilitate future fluid movement without the need for application of additional energy. This enables the provision of a very simple system for the operation of the cartridge, as described further below.

The first channel may optionally comprise a first channel valve which may optionally be a closable valve. A "closable valve", as referred to herein, is a valve which defaults to the open position until caused to move to a closed position (for example by a valve actuator as described elsewhere herein). This has the advantage that, while the cartridge is in storage prior to use, such a valve remains open, reducing the likelihood that elements forming the valve might degrade in some way such that the valve becomes fixed in a closed position.

The first channel and the second channel may be arranged to meet at the first junction, the first junction being connected to the sample processing chamber by a processing channel. In this case, the second channel port links the processing channel with the sample processing chamber. This has the effect that initial sample enters the sample processing chamber from the first channel via the first junction, the processing channel and the second channel port; analytic sample may leave the sample processing chamber via the second channel port, the processing channel, the first junction and the second channel, for example when the first channel comprises a first channel valve which has been moved to a closed position after the initial sample has entered the sample processing chamber, or when the sample entry location is sealed, for example by engagement of a lid as described elsewhere herein. Either action effectively prevents fluid proceeding back along the first channel.

The processing channel may be minimal in length, such that the first junction abuts the second channel port.

The sample processing chamber may be a chamber adapted for any sample processing step, for example, metering of a required volume from a larger initial sample volume, or sample preparation such as lysis and/or washing of an initial sample and/or elution or isolation of analyte from the initial sample and/or amplification of a target nucleic acid sequence in the initial sample (wherein "initial sample" is the sample as introduced to the sample processing chamber via the first channel). "Sample processing" therefore indicates any handling of initial sample which results in an "analytic sample", which is a sample suitable for transfer to the sample analysis location. "Raw sample", as referred to herein, indicates the sample introduced by a user into the cartridge at the sample entry location. "Initial sample", as mentioned above, is the sample which enters the sample processing chamber. The initial sample may be the same as the raw sample when there is no sample receiving well (which is described below), or any other location arranged to cause a change in the raw sample prior to entry into the sample processing chamber (such as cell lysis or sample dilution) when the cartridge is in use.

In one example, the sample processing chamber may comprise or consist of a closed sample processing well which may be a substantially vertically orientated closed sample processing well. In some arrangements, the second channel port may be located at or adjacent a base of the sample processing well. The sample processing well may be formed in a shape resembling a stemmed wine glass, with the processing channel forming the "stem", the second channel port positioned vertically above the stem and the first junction positioned at the base of the stem. The base of the well forms a funnel shape, therefore, with the processing channel aperture formed as the narrower mouth of the funnel.

Regardless of its shape or orientation, the sample processing well may comprise side walls which are elastic, such that the interior volume of the well may be increased by the movement of the side walls, i.e., the well may be at least partially formed to be expandable. For example, the walls may be formed by an elastic material, capable of reversibly stretching outwardly or lengthwise to accommodate an increased volume, or the walls may be formed to enable the well to be expandable; for example, the sample processing well may be formed with at least a portion in the form of bellows. The walls may be formed so that entry of initial sample into the sample processing well may cause the total volume of the well to increase by expansion and, alternatively or in addition, cause an increase in the pressure of air contained in the well prior to entry of the sample. The sample processing well may, alternatively or additionally, be formed in a syringe-like arrangement, with the well being at least partly formed as a chamber comprising a sliding plunger which may be moveable to increase the volume of the chamber when a volume of liquid or air enters the chamber. The elastic side walls or plunger may be spring loaded so as to resist the expansion in volume of the chamber. Indeed, as described further below, in any arrangement of the sample processing well, there may be a resilient member or spring configured, as part of the cartridge or external to it, to resist the expansion of the well, so as to promote an increase in pressure and also smooth egress if liquid from the well, when the cartridge is reconfigured to allow or promote liquid egress, as described herein.

The sample processing well may comprise one or more reagents such as a lysis buffer, which may be in the form of a lyophilised reagent which is reconstituted on contact with liquid initial sample upon entry into the well. Alternatively or additionally, the sample processing well may comprise beads such as magnetic beads, which may be useable to disrupt a sample and/or to immobilise an analyte onto the beads whilst other components of the initial sample are removed from the well.

The sample processing chamber may be further in flow communication with a first reagent channel extending from a first reagent well (comprising a first reagent); and/or the sample processing chamber may be further in flow communication with a second reagent channel extending from a second reagent well (comprising a second reagent); and/or the sample processing chamber may be in flow communication with at least one waste channel extending to a waste well. The sample processing well may additionally be in flow communication with one or more further reagent channels extending from one or more further reagent wells.

In any of these embodiments, any reagent channel and/or waste channel may be in flow communication with the first junction. More than one channel may meet at the first junction, or the channels described above may not need to meet at a single coincident location, instead being staggered, for example in a manifold arrangement to form a manifold junction. Any of the channels described in the foregoing may additionally comprise a channel valve which may be closable. The waste well may be a well which is not sealed and/or has sufficient dimensions to enable free movement of liquid into the well without hindrance by accumulation of any back-pressure in the well.

The above-mentioned features may also be utilised in other wells which may be included in the cartridge, for example, a closed sample receiving well as described below. The features described should, also, therefore, be taken as features disclosed and described in relation to a sample receiving well and any other closed well referred to herein.

The first reagent may be a wash solution and the second reagent may be an elution solution. Such a cartridge may be used in a system or a method in which initial sample proceeds through the first channel into the sample processing well, resulting in an increase in the pressure of air within the well, for example above the sample when the well is arranged vertically. A first channel valve positioned within the first channel may be moved from an open to a closed position, preventing liquid from moving along the first channel back towards the sample entry location. Alternatively or additionally, this may be achieved by sealing the sample entry location by engagement of a lid with a sample receiving container located at the sample entry location, as described elsewhere herein.

An analyte binding partner on magnetic beads contained within the sample processing well may bind to analyte of interest. A magnet may be positioned within, or close to the exterior of, the sample processing well and may be made effective (by positioning or by activation of an electromagnet) to generate a clamping field that immobilises the beads within the well. Alternatively or additionally, an activated filter or frit may be located in the well to achieve the same isolation of an analyte of interest A valve positioned in the waste channel (which may be referred to as a waste channel valve) may be moved from a closed to an open configuration, to allow liquid contained in the sample processing chamber to exit, under the influence of pressure within the chamber, via the waste channel, into the waste well (which, as mentioned, is arranged to enable free movement of liquid into the well without hindrance by accumulation of back-pressure in the well). The analyte of interest, if present in the initial sample, is retained on the beads and/or activated filter or frit in the sample processing chamber. The waste channel valve may be returned to a closed position. Wash buffer may be urged from the first reagent well, via the first reagent channel into the sample processing well, re-pressurising it in the same manner as described previously. Any magnetic beads in the sample processing chamber may be released into the buffer by deactivation of the clamping field to facilitate improved washing. Subsequent reactivation of the clamping field, closing of the first reagent channel valve and opening of the waste channel valve may allow this wash buffer to be transferred under the action of stored pressure into the waste well, after which the waste channel valve is again closed. Finally, elution buffer may be urged from the second reagent well via the second reagent channel into the sample processing well, with deactivation of any clamping field to facilitate elution. A second reagent channel valve may be moved from an open to a closed configuration. The elution buffer may cause any analyte immobilised on the beads to be released into the elution buffer, forming the analytic sample. Finally, second channel valve may be moved from a closed to an open configuration, allowing the analytic sample to move through the second channel into the sample analysis well positioned in the sample analysis location.

In this method, the wash buffer and the elution buffer may be urged to move from the first reagent well or second reagent well, respectively, under the influence of a pressurised gas such as pressurised air, which may be introduced from an external source, or may be obtained from an on-cartridge, integral source of compressed air as described in more detail below.

Alternatively or additionally, in the cartridge according to the invention, the sample processing chamber may comprise a meter well fluidly connected by a third channel to a closed meter overflow well. The meter overflow well is "closed" in that liquid cannot exit the well by any route other than via the third channel. The meter well may be arranged such that initial sample entering the well will completely fill it, prior to entering the third channel and then, if sufficient volume is added, the meter overflow well. Therefore, the meter well may be arranged with an entry aperture, which may be the second channel port, positioned at the base of the well, with an exit aperture to the third channel positioned at the top of the well. Therefore, the meter well is full prior to egress of liquid via the exit aperture into the third channel.

The closed meter overflow well may be formed in a similar way to the sample processing well described above. That is, the meter overflow well comprises side walls which are elastic, such that the interior volume of the well may be increased by the movement of the side walls. For example, the walls may be formed by an elastic material, capable of stretching outwardly or lengthwise to accommodate an increased volume, or the walls may be formed to enable the well to be expandable; for example, the meter overflow well may be formed with at least a portion in the form of bellows. The walls may be formed so that entry of initial sample into the meter overflow well may cause the total volume of the well to increase by expansion and, in addition, cause an increase in the pressure of air contained in the well prior to entry of the sample. The meter overflow well may, alternatively or additionally, be formed in a syringe-like arrangement, with the well being at least partly formed as chamber comprising a sliding plunger which may be moveable to increase the volume of the chamber when a volume of liquid or air enters the chamber. As described above, there may be a resilient member or spring configured, either as part of the cartridge or external to it, to resist the expansion of the well.

The pressure generated in the meter overflow well has the effect that, when the sample entry location is sealed by engagement of a lid with a sample receiving container located at the sample entry location, and/or when the first channel valve is closed (along with any valve in any other reagent channel and/or waste channel which is in flow communication with the sample processing chamber) and the second channel valve is open, the pressure will cause liquid contained in the meter well to flow through the second channel into the sample analysis well positioned in the sample analysis location.

The third channel may connect with the meter overflow well at the top of the meter overflow well, such that liquid entering the overflow well descends under gravity into the well and is not capable of moving back through the third channel when the second channel valve is open. This ensures that only the volume of liquid retained in the meter well (plus the volume of the surrounding channels) is caused to move towards the sample analysis well by the effect of the pressure in the overflow well, once the second channel valve is opened. The meter well may, therefore, be configured to provide a predetermined suitable volume to the sample analysis well. For example, for a nucleic acid amplification reaction 15-60 µl may be suitable, for example 20-50 µl, or about 23 µl, 24 µl, 25 µl, 25 µl, 27 µl or about 28 µl, ideally about 25 µl. This arrangement provides a reliable and simple means of isolating a required pre-determined volume for the analytic sample from a larger volume of initial sample, without the requirement for complicated metering or control systems.

In situations, as is very often the case in small fluidic cartridges, where internal surface tension forces may reduce or overcome the effects of gravity, the outcome described above is alternatively or additionally encouraged by the optional presence in the meter overflow well of a wicking material, positioned substantially across a portion of the base of the well and preferably extending upwardly towards the entry location of the third channel into the meter overflow well. This wicking material absorbs any liquid entering the meter overflow well, drawing it away from the third channel and ensuring that any such liquid is prevented from egress via the third channel, under the influence of the increased pressure in the closed meter overflow well resulting from the entry of sample into the sample processing chamber.

As briefly mentioned above, when either or both of the sample processing well and/or the meter overflow well are present and have an elastic side wall or incorporate a sliding plunger, one or more resilient members each in contact with the corresponding exterior of the sample processing well or the meter overflow well may be present. Each resilient member may be part of the cartridge or external to it and may comprise, for example, a helical spring, but may be any element which serves to resist the expansion of the sample processing well or the meter overflow well. Expansion may, therefore, occur under the influence of liquid entering the sample processing chamber, the elastic nature of the sample processing well and/or meter overflow well allowing it to expand with a lower increase in pressure than would be the case if the well had a rigid side walls. One skilled in the art will understand this provides a reduced spring rate and is important to provide a better controlled flowrate during egress of liquid from the sample processing chamber. Where present, the resilient member will also serve to encourage the contraction of the sample processing well and/or meter overflow well when the second channel valve (or the waste channel valve, when present) is moved to an open configuration. It is still the case, as described above in relation to the concept of the "closed" sample processing chamber, that a back-pressure is generated within the chamber by the initial introduction of sample into the device via the sample entry location with optional additional introduction of pressure from other sources.

As mentioned, the cartridge also contains one or more valve elements that are used to control the timing of the displacement of fluid within the chains in the manner described. A volume of liquid can thereby be retained at a specific location, whilst another process such as heating of it, for example, is performed before the valve is opened, releasing it to be displaced to another location.

Valves positioned in one or more of the channels, as mentioned throughout this specification, may take any form known in the art. For example, such valve elements may consist of an opening at one end of a hole whose axis is generally orthogonal to the surface coincident with the opening, coupled with which is a flexible membrane that extends over and beyond the opening in a direction generally parallel to said surface, and in such a way that an external co-operating actuator can open or close the valve element by applying or releasing a force to the flexible membrane in a direction that is generally aligned with the axis of the hole. This is a "membrane valve", as described further below.

A region of the surface adjacent to the hole may contain a small elastomeric seal, such as an O-ring. However, the flexible member may be sufficiently compliant to ensure sealing with the surface surrounding the opening. Under this configuration, an annular portion of the surface immediately around the opening may be further surrounded by a recessed area in such a way that it forms a discrete valve seat. Therefore, the valve seat may comprise a relatively narrow band of protruding material concentric to said opening.

Therefore, a valve, particularly a closable valve as referred to herein, may be formed by a valve location (which may be or may comprise a recess) formed in a surface of a body forming part of the cartridge between a primary channel portion and a secondary channel portion, the primary and secondary channel portions together forming one channel, the valve location (or recess) comprising an entry aperture from the primary channel portion and an exit aperture from the secondary channel portion, the valve location (or recess) being non-sealingly covered by a membrane formed across the valve location, such that air or liquid can flow from the primary channel portion to the secondary channel portion or vice versa. This arrangement is referred to herein as a membrane valve, described in the preceding sentence in the open configuration. Such a valve defaults to an open configuration, in which liquid can flow from the primary channel portion through the valve location into the secondary channel portion and vice versa. However, contacting the membrane extending across the valve location with an external body dimensioned to enable displacement of the membrane into a sealing relationship with the valve location, so as to occlude the primary channel portion entry aperture and/or the secondary channel portion exit aperture, has the effect of placing the valve in the closed configuration so that air or liquid cannot flow between the first and second channel portions. This may be achieved, for example, by use of a ball, or other simple valve closure element, positioned within a carriage unit with which the cartridge may be engaged, the ball or closure element being moveable against the action of a spring which serves to urge it into sealing contact with the valve location, when the cartridge is appropriately positioned relative to the carriage unit (as described below).

Any valve, or all valves, mentioned throughout this specification may be provided in accordance with the above description of a membrane valve.

The sample analysis location comprises a sample analysis well, which may be a well suitable for analysis of a sample. It will be appreciated the word "well" does not imply any particular geometry and, in particular, does not require that the well has a round shape or that it is deeper than it is wide. The term does not preclude alternative geometries, such as a well being formed in the shape of a channel.

Sample analysis may comprise simple detection of the binding of an analyte in the sample to an antibody which may be coated onto an interior surface of the sample analysis well and which may be detected by a competitive ELISA assay, for example. Such assays are wholly routine to the skilled person. Alternatively, the sample analysis well might comprise one or more assay reagents, for example in lyophilised form, which might adopt a given optical property, such as (for example) colour, absorption, reflectivity, fluorescence, luminescence in the presence of a target analyte. In a further alternative, the sample analysis well may comprise one or more reagents necessary for conducting a nucleic acid amplification reaction (or a further reaction, if one has already been carried out in the sample processing chamber), such as a polymerase chain reaction, an isothermal amplification reaction, or any other nucleic acid amplification reaction known in the art. The sample analysis well may, therefore, be formed from a thermoconducting material (i.e., a material which will conduct heat to any contents of the well, such as a liquid sample). The nucleic acid amplification reaction may comprise detection in the sample analysis well of a target nucleic acid sequence in a sample, for example by use of fluorescent probes or other reaction monitoring and detection mechanisms well known in the art. In those circumstances, the sample analysis well may have particular optical properties, including transparency at the wavelengths of interest and/or focussing effects.

However, the sample analysis location may further comprise a detection location which is distinct from the sample analysis well and connected by a fourth channel to the sample analysis well. Such a detection location may, for example, comprise a lateral flow device (LFD), or any other means of visualising or detecting the presence of an analyte in a sample. For example, a fluorescent tag or label may be introduced into an amplified nucleic acid sequence, with any increase in fluorescence being detected at the detection location as opposed to within the sample analysis well.

In the cartridge according to the invention, the first channel may comprise a primary first channel portion, a secondary first channel portion and a closed or compressible sample receiving well positioned therebetween, the secondary first channel portion comprising a first channel valve. That is, the first channel is split into a primary portion and a secondary portion (the "primary first channel portion" and "secondary first channel portion", or a first half and a second half), with the sample receiving well linking the two portions. The primary first channel portion may be minimal in length, such that the sample entry location is close to the sample receiving well, optionally separated from it by a filter, or such that the sample entry location abuts the sample receiving well. The first channel valve may be formed as a membrane valve, as described above.

Where a well or chamber is referred to herein as "compressible", it may have similar structural features to a closed well, with the addition of a connection to a source of compressed air. Therefore, compressed air may be driven into a compressible well or chamber. However, it is still a "closed" well or chamber in that there is no route available for sample to exit the chamber or well.

The sample receiving well may be suitable for initial processing of raw sample received from the sample entry location via the primary first channel portion, to provide an initial sample for transfer to the sample processing chamber via the secondary first channel portion. Therefore, the sample receiving well may comprise one or more reagents required for processing of a raw sample to provide an initial sample; examples of such reagents include a lysis buffer, disruption beads, magnetic stirring particles or bars, or any other suitable reagent. Alternatively or additionally, one or more such reagents may be added to the raw sample prior to introduction into the cartridge. The sample receiving well may be formed from a thermoconducting material, to enable heating of the raw sample, if required, during the process of providing an initial sample for transfer to the sample processing chamber. Alternatively or additionally, depending on the disruption method to be used, the sample receiving well be arranged to transfer ultrasonic energy or magnetic force to the sample contained in the well, for example for ultrasonic disruption or agitation of magnetic beads or turning of a magnetic stir bar.

The closed or compressible sample receiving well may have the features described above in relation to the sample processing chamber, to provide a closed well in which an increased pressure may be achieved on transfer of liquid into the sample receiving well, when the first channel valve is in a closed configuration. For example, initial sample may only exit the well via a secondary first channel portion port, in fluid connection with the secondary first channel portion, the port being positioned in a sample receiving well accumulation region. In a manner equivalent to that described above regarding the sample accumulating region (in the sample processing chamber), this is a region of the sample receiving well in which liquid raw sample first starts to accumulate when entering the sample receiving well from the primary first channel portion. Likewise, the sample receiving well may comprise side walls which are elastic, such that the interior volume of the well may be increased by the movement of the side walls. For example, the walls may be formed by an elastic material, capable of reversibly stretching outwardly or lengthwise to accommodate an increased volume, or the walls may be formed to enable the well to be expandable; for example, the sample receiving well may be formed with at least a portion in the form of bellows. The walls may be formed so that entry of raw sample into the sample receiving well may cause the total volume of the well to increase by expansion and, alternatively or in addition, cause an increase in the pressure of air contained in the well prior to entry of the sample. The sample receiving well may, alternatively or additionally, be formed in a syringe-like arrangement, with the well being at least partly formed as chamber comprising a sliding plunger which may be moveable to increase the volume of the chamber when a volume of liquid or air enters the chamber. The elastic side walls or plunger may be spring loaded so as to resist the expansion in volume of the chamber. Indeed, as described further below, in any arrangement of the sample receiving well, there may be a resilient member or spring configured, as part of the cartridge or external to it, to resist the expansion of the well, so as to promote an increase in pressure and also smooth egress if liquid from the well, when the cartridge is reconfigured to allow or promote liquid egress, as described herein.

It will be understood that the sample receiving well can have a configuration similar to that described above for the sample processing well, provided that it retains the closed attribute, as defined. For example, the sample receiving well may have the stemmed wine glass configuration.

The sample receiving well may optionally be connected to a closed or compressible sample overflow well by a fifth channel. The closed or compressible sample overflow well may be a closed well having features as described above in relation to the meter overflow well, to provide a well in which an increased pressure may be achieved on transfer of liquid into the sample receiving well, through the fifth channel and into the sample overflow well, when the first channel valve is in a closed configuration. The description above of the features relating to the meter overflow well are also a disclosure of equivalent features relating to the sample overflow well.

The sample receiving well and/or the sample overflow well where present, may be connected to a source of compressed gas such as air, which may be released at an appropriate time, to drive liquid from the sample receiving well and/or sample overflow well, through the secondary first channel portion on into the sample processing chamber, when the first channel valve is in the open configuration. Liquid is prevented from returning through the primary first channel portion by the sealing of the sample entry location by engagement of a lid, as described further below, and/or by the presence of a further valve in the primary first channel portion, the valve being in a closed configuration.

Where present, the sample overflow well may comprise a wicking material, for the same purpose and as described above in relation to the meter overflow well.

The secondary first channel portion may comprise a first end in the form of a "dip tube" which extends downwardly into the sample receiving well, with an opening forming the secondary first channel portion port, located at the sample receiving well accumulation region (i.e. at or close to the base of the well), and a second end fluidly connected to the sample processing chamber. The second end may be fluidly connected to a dip tube junction which is in fluid connection with the primary first channel portion; this has the effect that the primary first channel portion is in fluid connection with the sample receiving well via the dip tube junction and the dip tube, the tube also acting as at least a part of the secondary first channel portion.

The fifth channel may make fluid connection with the sample receiving well at a position at an upper region or at the top of the sample receiving well. This arrangement has the effect that the sample receiving well will partially or completely fill until the well contains liquid to such a depth that it overflows via the fifth channel into the sample overflow well. Meanwhile, the location of the secondary first channel portion port at the sample receiving well accumulation region, for example by way of a dip tube extending into the liquid to almost its entire depth, has the effect that, when the first channel valve located in the secondary first channel portion is placed in the open configuration, the air pressure generated in the closed sample receiving well by the addition of liquid into the sample receiving and/or overflow wells, or by the application of compressed air from a compressed air source linked to the sample receiving well and/or the sample overflow well when present, pushes down on the surface of liquid in the sample receiving well and forces it up through the first end of the secondary first channel portion, to proceed on towards the sample processing chamber. Liquid located in the sample overflow well, when present, may be prevented from moving back into the sample receiving well, by the presence of wicking material in the sample overflow well to draw the liquid away from the fifth channel.

As described herein, there may be other volumes of liquid retained at locations or reservoirs within the cartridge, or provided in a reservoir of liquid associated with a lid as described below. In at least some embodiments, these are filled as part of a manufacturing process.

Furthermore, there may be a need for some reagents to be in liquid form and others to be dry, such as by freeze-drying or lyophilisation. Such dried reagents may be susceptible to moisture ingress, so for these to be stored within the same cartridge as wet reagents, it is advantageous for there to be a barrier, preferably a metallic barrier such as an aluminium foil, for example in the form of a pouch that extensively or completely surrounds one or the other type, preferably the dried reagents. In use, prior to use in a process requiring that liquid reagents and/or sample material can reach the dried reagents, the cartridge may contain small pin-like features that puncture the barrier at the appropriate points, such as where flow passages are required to cross the barrier. The action of a controller (i.e., carriage unit, described elsewhere herein), in which jaws converge onto and clamp the cartridge, may depress such pin-like features to puncture the barrier. Therefore, in any embodiment, the cartridge according to the first aspect of the invention may comprise a first cartridge body (which may be a "dry" layer of the cartridge, as discussed further below) in which is formed one or more of the sample processing chamber, the sample analysis well and at least a portion of one or more of the first and second channels. The cartridge may further comprise a second cartridge body in which may be formed one or more further features of the cartridge. The cartridge may optionally further comprise one or more additional cartridge bodies, in each of which may be formed one or more further features of the cartridge. Each cartridge body may be joined, permanently or reversibly and optionally including any fixing mechanism, to one or more other cartridge bodies. In some embodiments, the first cartridge body may be formed in a substantially cuboid shape, with an upper and a lower square or rectangular surface; the cuboid may appear to be in the form of a plate, i.e. to be substantially planar, with a comparatively small distance separating the upper and lower surfaces. The provision of two or more cartridge bodies allows the cartridge to be manufactured with some regions within the device isolated from the atmosphere or surrounding environment, for example to preserve sterility of the interior of the cartridge or to prevent moisture ingress to regions of the device containing lyophilised reagents or, for example, a LFD. This may be achieved, for example, by covering at least a part of one surface of the first cartridge body, such as the upper surface, with a cover layer such as a flexible material, or by encasing the whole first cartridge body in a bag, pouch or encapsulating membrane formed by other means. When a second or further cartridge body is engaged with the upper surface of the first cartridge body, provision may be made within the first, second or further cartridge body to puncture or pierce the cover layer separating the first cartridge body from the remainder of the device, either as soon as the first cartridge body is engaged with one or more further cartridge bodies, or at an appropriate moment during use of the cartridge. This may be achieved, by way of non-limiting example, by the inclusion in one or more cartridge bodies of a pin in the region in which puncturing or piercing of the cover layer is desired, to provide a pin valve as described below.

In an embodiment, the cartridge may comprise a first cartridge body in which is formed the sample analysis well and further comprise a second cartridge body in which is formed the sample entry location and a liquid-containing well connected by a sixth channel to the sample processing chamber or sample analysis well, the sixth channel being formed by a primary sixth channel portion formed in the second cartridge body and a secondary sixth channel portion formed in the first cartridge body, the first and second cartridge bodies being arranged to enable fluid connection between the primary and secondary sixth channel portions at a second junction. The liquid-containing well may contain a buffer or diluent, for example and may be termed a "buffer well" or "diluent well", as appropriate. The first cartridge body and second cartridge body may be separated by a sealing layer, for example a layer of flexible film, which may be punctured or pierced at the location of the second junction in order to provide fluid connection between the primary and secondary sixth channel portions. This may be achieved by inclusion in the first or the second cartridge body of a pin which is moveable from a first position to a second film-piercing position, to provide a pin valve as described below.

Such a pin may appear at more than one location within the cartridge, to enable fluid connection between channel portions at more than one junction. Any such arrangement may be referred to herein as a junction pin and is especially useful when the junction links two channels or channel portions formed in different cartridge bodies. For example, the first cartridge body may have an upper surface which abuts a lower surface of the second cartridge body, such that, when the cartridge is formed, the second cartridge body, in use, sits on top of the first cartridge body. A primary channel portion may be provided with a horizontal portion formed in the upper second cartridge body, with a vertical channel portion having a top end and a bottom end, the top end being in flow communication with the horizontal portion and the bottom end terminating in a first aperture formed in the lower surface of the second cartridge body. The secondary channel portion may be provided in the lower first cartridge body, with a first end terminating in a second aperture formed in the upper surface of the first cartridge body. When the first and second cartridge bodies are joined to one another, they may be relatively positioned such that the first and second apertures of the primary and secondary channel portions are in flow communication with one another, thereby forming a junction through which liquid may flow from the primary channel portion to the secondary channel portion via the vertical channel portion of the primary channel portion. However, this junction may be occluded by the presence of a sealing layer or film positioned between the first and second cartridge bodies. A junction pin may, therefore, be positioned at the top end of the vertical portion of the primary channel portion such that the pin may be urged to extend into and through the vertical portion in order to pierce the film and provide the flow communication between the primary and secondary channel portions, via the junction, to provide the unobstructed channel. The skilled person will understand that this is a simple method of providing a non-reversible valve, such that the cartridge can be manufactured with some channels in a closed configuration and can be opened to enable fluid flow through the channels, by actuation of the junction pin. The pin may have a shaft formed to avoid blocking the vertical portion of the channel when the pin is in the second film-piercing position, for example by being formed to comprise a hollow needle with a radial side opening, arranged to be in flow communication with the primary channel portion, through which liquid may flow. A valve as described above may be referred to herein as a "pin valve".

The liquid-containing well may comprise a fluid dispensing system according to the fourth aspect of the invention as described below, wherein the dispensing chamber of the fluid dispensing system is arranged to be in fluid communication with the sixth channel of the cartridge when the dispensing chamber is in the open chamber configuration.

The cartridge may be one in which the sample analysis location further comprises a detection location which is distinct from the sample analysis well and connected by a fourth channel to the sample analysis well, the cartridge further comprising a liquid-containing well connected by a sixth channel to the sample analysis well. Optionally, the fourth channel may comprise a primary fourth channel portion, a secondary fourth channel portion and a mixing well positioned therebetween, the mixing well being formed in a shape which is sinuous. The term "sinuous" indicates that the well has a longitudinal axis in which there is at least one bend or turn, i.e., at least one change in direction; the well is not circular, oval or cuboid in shape. The primary fourth channel portion may form part of the mixing well, so that the mixing well is directly joined to the sample analysis well without any intervening channel, for example by means of a simple aperture formed in a wall separating the sample analysis well from the mixing well. Alternatively or additionally, the secondary fourth channel portion may form part of the mixing well, so that the mixing well is directly joined to the detection location without any intervening channel, for example by means of a simple aperture formed in a wall separating the mixing well from the detection location.

Alternatively, the cartridge may be any embodiment which comprises a first cartridge body in which is formed the sample analysis location which comprises a detection location which is distinct from the sample analysis well and connected by a fourth channel to the sample analysis well, the cartridge further comprising a second cartridge body in which is formed a liquid-containing well connected by a sixth channel to the sample analysis well, the sixth channel being formed by a primary sixth channel portion formed in the second cartridge body and a secondary sixth channel portion formed in the first cartridge body, the first and second cartridge bodies being arranged to enable fluid connection between the primary and secondary sixth channel portions at a second junction, as described above. The sample processing chamber may be formed in the first cartridge body and the sample entry location may be formed in the second cartridge body, with the first channel comprising a primary first channel portion formed in the second cartridge body and a secondary first channel portion formed in the first cartridge body, the first and second cartridge bodies being arranged relative to one another to enable fluid connection between the primary and secondary first channel portions at a third junction. Alternatively, as described above, a sample receiving well may also be located between the primary first channel portion and the secondary first channel portion. In this arrangement, the sample receiving well may be formed in the first cartridge body, with the secondary first channel portion comprising an alpha portion formed in the first cartridge body and a beta portion formed in the second cartridge body, the first and second cartridge bodies being arranged relative to one another to enable fluid connection between the alpha and beta portions at the third junction (which may be referred to in this context as the "alpha junction"). Alternatively, the sample receiving well may be formed in the second cartridge body, with the primary first channel portion comprising a delta portion formed in the first cartridge body and a gamma portion formed in the second cartridge body, the first and second cartridge bodies being arranged relative to one another to enable fluid connection between the gamma and delta portions at the third junction (which may be referred to in this context as the "delta junction").

Any well referred to herein which is specified to be "closed" can have any one or more of the features described herein in relation to the closed sample processing well, closed meter overflow well, closed sample receiving well, and/or closed sample overflow well. For example, a "dip tube" arrangement may be utilised to locate a port providing access to a channel through which a sample is to exit from a chamber, in a region of the well in which sample entering the well initially accumulates. Any of the wells may be formed with a "stemmed wineglass" configuration as described above in relation to the sample processing well.

It will be appreciated that as one or more volumes of liquid, or aliquots of the same, are manipulated through the network in the cartridge, a supply of air pressure other than that generated in the sample processing chamber as described above, may be necessary to drive various steps of the process. Typically in the types of cartridge anticipated by the disclosures here, a driving air pressure in the region of 30 to 100 mbar has been found to be optimal to achieve steady and well-controlled fluid manipulation. This may be provided by either a reservoir of air at elevated pressure, an air compressor, or both. Where this includes an air compressor, it is advantageous for this to be located within the controller (i.e., carriage unit, as described below), for the reasons given above, and to make connection to the cartridge, via a suitable port or ports, to deliver pressure to one or more locations in the fluid manipulation network as required. Therefore, the cartridge may comprise or be capable of connection to a source or multiple sources of compressed gas (such as air), connected by a gas channel to at least one of the other channels, chambers, wells or voids in the cartridge. The gas channel may comprise a valve, for example a pin valve or a membrane valve as described elsewhere herein.

For example, when the cartridge is an embodiment comprising a compressible sample receiving well or sample overflow well, the cartridge may further comprise a first source of compressed gas, such as air, in fluid connection via a seventh channel with the sample receiving well, optionally via the sample overflow well. Alternatively or additionally, when the cartridge is an embodiment comprising a liquid-containing well (e.g., a buffer well), the cartridge may further comprise a second source of compressed gas, such as air, in fluid connection via an eighth channel with the liquid-containing well. The first and second source may, in fact, be a single source connected to the sample receiving and/or overflow well via the seventh channel and to the liquid-containing well via the eighth channel, i.e., the source may be connected to more than one channel. Release of the air via the seventh and/or eighth channels may be separately controllable. The source of compressed air may additionally be connected to other parts of the cartridge via one or more additional channels, for example to various liquid-containing wells (such as wells containing wash or elution buffers) as described above. Each channel may comprise a channel valve which may be irreversibly openable, for example a pin valve openable by use of a junction pin as described above, or may be reversibly openable, for example by use of a membrane valve as described above. Other means of providing a reversible or irreversible valve are well known in the art.

Not only is an air compressor a relatively expensive component part to be included, but devices such as small positive displacement pumps typically develop much higher pressures than are optimal, as described above. This can be overcome by using an air accumulator with the necessary control systems, but that can be a relatively bulky and expensive solution. Alternatively, it can be rectified very simply by forming a leak in the outlet tubing to dissipate unwanted pressure, but this can create undesirable noise and is a waste of the energy that this invention seeks to preserve. One means by which an external air compressor can be avoided is for to provide an air reservoir, with a portion of the air reservoir walls to be flexible such as a bellows, or sliding such as a plunger, such that by depressing it the internal reservoir pressure can be elevated sufficiently to be useful to drive the fluid manipulation processes. The air reservoir may be located in either the controller or cartridge, but the action of inserting a cartridge into the controller as described below, and advancing the jaws as described causes a feature or member to depress the flexible or sliding wall and pressurise the reservoir during one or more of the relative motions that arise during cartridge insertion. This approach thus harnesses energy provided by the user to drive the cartridge, and by so doing, reduces the system's dependence on separate power supplies and components such as air compressors.

As mentioned, the source of compressed air advantageously may be provided by the action of engaging and closing a lid onto a container connected to or forming a part of the cartridge, as described in more detail below. Therefore, in one example, the action of engaging and closing the lid onto the container may (as will be outlined) create a pressure within closed parts of the cartridge by the introduction of sample into the cartridge and the sealing of the sample entry location. It may furthermore generate a source of compressed air which may be released at an appropriate time by the opening of a channel valve which is initially in a closed configuration, to prevent the compressed air from moving through the channels of the cartridge. This source of compressed air can be utilised, with minimal additional energy input, to effect movement of liquid through various channels, chambers and wells of the cartridge.

Alternatively, the source of compressed air may be in the form of a compressible air chamber or reservoir contained in the cartridge, for example comprising a well formed within the cartridge and with a compressible region such as bellows, to enable the introduction of air contained in the air chamber into one or more channels, chambers and wells of the cartridge by application of pressure to the compressible air chamber (for example, on engagement with a carriage unit as described elsewhere herein). Therefore, the source of compressed air may not be pre-compressed, but may become compressed on application of force to the compressible air chamber. In a further alternative, the source of compressed air may be external to the cartridge in the form of conventional compressed air canisters.

In any embodiment of the cartridge according to the invention, the sample entry location may comprise a sample receiving container in fluid connection with the first channel, the container having an interior (which may be defined by an interior surface) and an entrance aperture.

The container may comprise a container lid (which may form part of a sample swab device as described below) comprising a protruding distal portion which is formed to have mating dimensions with at least a portion of the interior surface of the container; wherein the container lid is sealingly connectable to the container via an interface configured to provide a progressive transition between open and closed configurations, further wherein, in the closed configuration, the protruding distal portion of the lid is in sealing contact with the interior (or interior surface) of the container. Alternatively, a similar outcome may be achieved if the distal portion of the lid is capable of surrounding the container and engaging sealingly with an outer surface of the container. For simplicity, the present description focusses on the distal portion making sealing contact with the interior of the container, but any lid/container arrangement which is effective to drive sample from the container interior into the cartridge via the first channel, when the lid is urged into the closed configuration, is encompassed.

Therefore, the "protruding distal portion" of the lid, referred to in relation to any embodiment of a lid described herein, may be a portion or nose of the lid which extends into the interior of the container when the lid is engaged therewith, and is typically formed as a portion extending orthogonally from the underside of the lid, the body of which sits across the container entrance aperture when in the closed configuration. By "mating dimensions" is meant that, when the lid is in the closed configuration, the material of the protruding distal portion makes sealing contact with at least a portion of one or more surfaces forming the interior of the container, thereby preventing egress of fluid in the container from the entrance aperture.

The external surface of the protruding distal portion may ideally, therefore, have an interference fit with the interior surface forming the interior of the chamber. This interference fit may be around the whole of the protruding distal portion, or a part thereof, for example by way of a circumferential sealing ring (such as, for example, a rubber or elastomeric O-ring), which may be provided around a circumference (or outer wall, where the lid is not cylindrical) of the distal portion of the lid, to make sealing contact with the container interior. The sealing contact between the distal portion of the lid and the container interior prevents the sample from exiting the container via the entrance aperture.

The container lid may comprise a sealed liquid reservoir, typically containing a liquid such as a wash solution, diluent or buffer, which may be unsealed by the action of moving the lid from the open to the closed configuration. For example, the container or the lid may comprise a pin member which may be urged to pierce a material forming the reservoir, for example a film extending across a reservoir opening, thereby releasing liquid contained in the reservoir when the lid is moved to the closed configuration.

A second aspect of the invention provides a sample receiving container suitable for engagement with the cartridge according to the first aspect of the invention at the sample entry location (for example by way of mutually engageable or interlocking features formed at the base of the container and at the sample entry location), comprising a container having an interior (which may be defined by an interior surface), an entrance aperture and an exit aperture, and a container lid comprising a protruding distal portion which is formed to have mating dimensions with at least a portion of the interior (or interior surface) of the container; wherein the container lid is sealingly connectable to the container via an interface configured to provide a progressive transition between open and closed configurations, further wherein, in the closed configuration, the protruding distal portion of the lid is in sealing contact with the interior (or interior surface) of the container, as described above. The lid may comprise a sealed liquid reservoir, as described above.

In the cartridge according to the first aspect of the invention comprising a sample receiving container, or in the sample receiving container according to the second aspect of the invention, the container lid comprises one or more first interlocking features and the container comprises one or more second interlocking features, the first and second interlocking features being engageable to provide the interface between the lid and the container. The first and second interlocking features, when engaged, may provide a screw connection or a bayonet connection.

The cartridge according to the first aspect of the invention may comprise the sample receiving container according to the second aspect of the invention engaged with the cartridge at the sample entry location so as to place the exit aperture of the container in fluid connection with the first channel of the cartridge.

As described above, therefore, in cartridges that are designed to perform a process on a sample of material that is loaded through some form of sample inlet port, any cap, lid, plug or stopper associated with the inlet port can also comprise a protruding distal portion acting as a moving plunger that makes sliding and sealing contact with the inlet port. In a simple design of this arrangement it might simply pressurise the headspace of air above the liquid to provide a supply of compressed air.

As mentioned, the cap may have a rotary action that assists and controls the sliding engagement, such as a screw thread or a bayonet style fitting.

There may also be multiple seals within the cap which can be used to create more than one sealed volume, only one of which might contain a loaded sample, such that as the cap advances a separate volume, or multiple volumes, of air can be pressurised in addition to the headspace above the sample. Where any of these volumes are connected to other regions of the cartridge by means of the internal network of passages, the action of the cap can be utilised to pressurise those that form the initial volume of any chains of fluid control features described herein.

It will be apparent that the geometry of the sealing regions within the cap and the associated areas of the cartridge can be so arranged that the seals are made either simultaneously or are staggered in some pre-determined sequence. The design can thereby cause air pressure to be advanced into the internal network of the cartridge before the reservoir contents are released, or the converse of this, or some other combination. Furthermore, by means of the geometry and sequencing described, the transport of liquid into the cartridge can be arranged to be predominantly hydraulic, pneumatic or some combination of the two.

In any embodiment referred to herein, the sample receiving container and the container lid may be mutually formed so that, when the lid is in the closed configuration, the lid and the container between them form a subcontainer comprising compressed air. For example, the container may comprise a first subcontainer portion and the lid may comprise a second subcontainer portion which may form a sealing relationship with the first subcontainer portion when the lid is engaged with the container and moved to the closed configuration, thereby defining a subcontainer interior comprising compressed air. In an embodiment, the first subcontainer portion may be in the form of an annular space or chamber, formed around the exterior of the sample receiving container; the second subcontainer portion may in the form of an annular piston capable of extending into and forming a sealing engagement with the interior of the space or chamber; therefore, as the annular piston extends into the space or chamber on the movement of the lid into the closed configuration, a subcontainer interior is defined, containing trapped air which is compressed and pressurised, until released from the annular space or chamber via a channel extending therefrom, for example on opening of a valve as described elsewhere herein.

The skilled person will understand that the annular space or chamber may instead be formed by the material of the lid, with the annular piston being formed as a ring extending around the exterior of the container. Any mutually formed features of the container and the lid which, when the lid is in the closed configuration, provide a subcontainer of compressed air, are suitable. Any arrangement which, when the cartridge is in use and the lid is moved from the open to the closed configuration, results in the generation of a reservoir of compressed air within the cartridge, is encompassed. For example, the mutually formed features of the container and lid may instead be provided by mutually formed features of container lid and another element of the cartridge, for example an additional element included in the cartridge at a position close to the sample entry location. Therefore, for example, when the container is included in or engaged with the cartridge, the action of closing the lid may also result in the formation of the subcontainer of compressed air, by the engagement of a feature of the lid with a feature of the additional element. The applicant does not, therefore, intend any limitation to the particular embodiments described in detail herein.

The subcontainer comprising compressed air may be the first source of compressed gas, and/or the second source of compressed gas, as described above.

In relation to a sample which a user may wish to process using the cartridge according to the invention, such sample may, in the case of many biological samples, for example, be viscous or semi-solid whereby it is advantageous to collect it by means of a sample collection device comprising a swab, brush or other applicator. This may be connected to the cap or lid as described herein, so that sample introduction and closure of the cap can be performed as a combined semi-continuous action.

It is normal for applicators such as swabs to have an elongate shaft to provide ample reach during sample collection. Where the applicator is attached to the cap in the current invention, the cap may be slidably connected and/or sealed to such an elongate shaft so that during insertion into a sample inlet port, the head of the applicator may first be placed either directly into the port or into a receptacle inside the port after which the cap slides down the shaft prior to engaging with the corresponding features in the cartridge. The port may be previously filled, either during manufacture or at other time prior to use, with a liquid such as a lysis agent, diluent or buffer that acts upon it to prepare it for subsequent processes.

The cap may furthermore contain a reservoir of liquid that is released during the sliding engagement described. To initiate this release of the reservoir contents, the cap may contain a valve that is actuated by the relative motion of the cap against the cartridge. Alternatively it may contain a membrane that is perforated by the relative motion of a somewhat sharp or pointed feature pressing against the membrane and causing it to puncture.

The contents of the reservoir may thereby be used, for example, to dilute, dissolve, suspend or perform some form of chemical reaction or biological process on a previously introduced sample or other reagent contained within the cartridge.

The walls of the reservoir, or some portion thereof, may also be flexible such that during the sliding engagement of the cap and release of liquid by one of the means described, the reservoir is compressed causing the liquid contents to be forced out under pressure. The flexible portion of the walls may be in the form of a diaphragm or bellows, for example.

In many applications, especially those involving viscous or semi-solid biological samples collected on a swab or brush, it is beneficial to both actively wash the matter from the swab and to introduce a liquid, such as a diluent or buffer solution, that acts upon it to prepare it for subsequent processes. Hence it is advantageous for the applicator and cap/reservoir, both as described above, to be combined, to provide a swab device according to a third aspect of the invention. The cap/reservoir can be initially situated at the proximal end of the shaft and thus act as a handle during sample collection.

In this configuration, the reservoir may have proximal and distal sliding seals located within its walls such that the shaft can pass through it without its contents being released, unless or until the distal seal reaches either the end of the shaft, or a region of reduced cross-section. The sliding distal seal thereby constitutes a valve that opens at the corresponding point in time.

The swab may also be arranged to engage with a receptacle inside the sample inlet port to facilitate the sliding of the reservoir over and along the shaft and also so that the sliding reservoir seal reaches the end of the shaft, or a region of reduced diameter, as the cap containing the reservoir enters into the inlet port. Based on the descriptions provided above, it will be apparent that the cap can thereby perform several functions including sealing into the sample entry port, releasing the contents of the reservoir, compressing the headspace of air above the released contents or compressing the air in a sub-container as previously described.

The receptacle feature within the sample entry port may be perforated or woven and thereby act as a sieve or coarse filter, so that as the swab head enters it and liquid from the reservoir passes over it, a washing action is achieved. A seal may also be created around an edge of the receptacle so that all of the released liquid is required to flow through the receptacle, thus increasing the efficacy of washing action and barring it from reaching any sub-container in which a reservoir of compressed air is being generated.

As described, there may also be multiple seals within the cap, including a first seal between the cap and the walls of the inlet port, a second seal between the walls of the reservoir and the walls of the inlet port or the receptacle and a third seal, between the walls of the reservoir and the swab shaft. The geometry of the associated pieces can be so arranged that the seals are made or broken either simultaneously or staggered in some pre-determined sequence. The design can therefore cause air pressure to be advanced into the internal network of the cartridge before the reservoir contents are released or the converse of this, or in some other sequence.

Therefore, the third aspect of the invention provides a sample swab device, for example as described in the preceding paragraphs, suitable for engagement with the sample receiving container of a cartridge in which the sample entry location comprises a sample receiving container in fluid connection with the first channel, the container having an interior (which may be defined by an interior surface) and an entrance aperture. The swab device comprises a container lid sealingly connectable to the sample receiving container, the lid comprising a first surface and an opposing second surface from which a protruding distal portion extends, the distal portion comprising a liquid reservoir (which may contain liquid therein, such as a wash solution, lysis agent, diluent or buffer) having an open reservoir configuration and a closed reservoir configuration. The device further comprises a rod having a first end and a second end, the rod being encircled by the protruding distal portion of the lid which is arranged relative to the rod so as to extend towards the first end of the rod, the distal portion (and, therefore, the whole lid) being moveable along the length of the rod between the first and second ends such that, when the protruding distal portion of the lid is positioned at the first end which may include a region of reduced diameter, the reservoir is in the open reservoir configuration and when the protruding distal portion of the lid is positioned away from the first end, the reservoir is in the closed reservoir configuration. The swab device container lid is sealingly connectable to the sample receiving container via an interface configured to provide a progressive transition between open and closed container configurations, further wherein, in the closed container configuration, the protruding distal portion of the lid is in sealing contact with the interior (or interior surface) of the container.

In an embodiment of the sample swab device, the liquid reservoir may be formed as a liquid-filled chamber within the distal lid portion, having a reservoir base adjacent the lid second surface and a reservoir nose, the reservoir base and reservoir nose each comprising an annular opening in sealing engagement with the rod when the protruding distal portion of the lid is positioned away from the first end, such that the rod extends through and is surrounded by the reservoir. The reservoir may be openable by providing the rod formed such that it has a smaller diameter at the first end so that, when the reservoir nose is positioned around the first end of the rod, there is no longer sealing engagement of the annular opening of the reservoir nose with the rod, such that liquid contained in the reservoir may flow under gravity from the reservoir.

Alternatively or additionally, the reservoir may be formed as a compressible chamber, wherein the reservoir nose is capable of engagement with the sample receiving container of the cartridge such that, in use, when the lid is connected to the sample receiving container and is in the closed configuration, the compressible chamber is compressed. This generates a pressure in the fluid contained in the reservoir and enables the fluid to overcome the sealing engagement of the annular opening at the reservoir nose, such that fluid may exit the chamber. This may be further encouraged where the rod is formed to have a smaller diameter at the first end so that, when the reservoir nose is positioned around the first end of the rod, there is no longer sealing engagement with the rod.

Alternatively or additionally, the lid may comprise a sealed liquid reservoir, as described above in relation to other lid embodiments.

In any embodiment of the sample swab device, the first end of the rod may further comprise a collection tool or material such as, for example, a hook, caliper, loop, fabric or brush. The location of the tool or material at the first end of the rod is such that, when fluid contained in the reservoir is released, it flows over or through the tool or material, flushing any sample collected using the tool or material into the sample receiving container. This forms the raw sample which may be caused to enter the cartridge described herein via the first channel, extending from the sample entry location.

The "container lid" mentioned in relation to the first and second aspects of the invention may be formed by the "swab device container lid" within the third aspect of the invention. The first and second aspects of the invention therefore encompass an arrangement in which a sample swab device according to the third aspect of the invention is engaged with a sample receiving container forming part of a cartridge according to the first aspect of the invention or with a sample receiving container according to the second aspect of the invention.

A fourth aspect of the invention provides a fluid dispensing system comprising a storage chamber in fluid connection with a dispensing chamber, the dispensing chamber being sealed with a film or membrane or other pierceable material to form a closed chamber configuration and comprising an integral pin moveable from a first position to a second film-piercing position, placing the dispensing chamber in an open chamber configuration. The integral pin may operate in the same way as described in relation to a junction pin as described above. The storage chamber may be compressible. Therefore, the fourth aspect of the invention provides a separate liquid storage vessel which may be engaged with the cartridge described above, to provide the liquid-containing well, only when ready for use; this minimises the possibility that liquid (which may be for use as a diluent) might proceed through the sixth channel prior to diluent being required in the sample processing method in which the cartridge is to be used.

A fifth aspect of the invention provides a sample processing system as described herein. The cartridge may be inserted into a controller mechanism (i.e., a carriage unit as described herein) prior to, or as part of, the manipulation sequence, to form the sample processing system described herein. In one arrangement, the controller comprises opposing jaws that engage predominantly onto corresponding opposite surfaces of the cartridge, effectively clamping it between the two. The opposing jaws may be upper and lower jaws, and may contain a plurality of operational elements, such as valve actuators, heaters, sensors, light sources, magnets and the like, that provide certain functions associated with the fluid manipulation steps.

In the case of valve actuators, these may co-operate with valve elements such as those described above in relation to the membrane valve. These actuators may also be spring-loaded in a direction that closes the valve elements by default once a cartridge is inserted into a controller. The same valve elements may however be open by default prior to insertion into the controller and this is advantageous in that a problem associated with many valves is overcome; namely, the tendency for the valve components to stick or bond together during prolonged idle or storage periods.

In the case of magnets, these may be electromagnets positioned in close proximity to a face of the cartridge or permanent magnets that can be moved into close proximity to the cartridge or retracted away from it by means of a dedicated actuator, for example. Either of these approaches may be used to trap or otherwise influence the movement of magnetic materials, such as magnetic beads, retained within the flow channels, wells, voids or features within the cartridge.

In one arrangement, as the cartridge is introduced into the controller, the opposing jaws move in directions that are opposite to each other and that, relative to the cartridge, are substantially orthogonal to the direction of insertion. In such a way, the jaws converge towards each other and the cartridge, effectively producing a simple clamping action. This can be achieved by each jaw being constrained to move along a locus, such as an arc of a circle whose axis is substantially orthogonal to both the insertion and clamping directions, such that the two loci are generally symmetrical about the path of cartridge insertion. This movement can also be driven directly by the cartridge as it is inserted causing the relative motion between the jaws and the cartridge to be generally orthogonal to the direction of insertion.

In most applications of the invention, the cartridge is likely to be a disposable sub-system, whereas the controller may be used multiple times to perform the same or similar processes on many different cartridges. Therefore, for economic reasons it is advantageous for the complexity and cost of the cartridge to minimised, and for any parts that can be in the controller, to be so located.

Therefore, the fifth aspect of the invention provides a sample processing system comprising the cartridge according to the first aspect of the invention and a controller or carriage unit engageable with the cartridge and being reversibly moveable from a cartridge receiving position to a cartridge processing position, the carriage unit comprising:
(a) a sample processing chamber receiving position and/or a sample analysis well receiving position, each receiving position being independently optionally temperature controlled;
(b) a second channel valve actuator; and
(c) a cartridge engagement feature to facilitate engagement between the cartridge and the carriage unit.

Optionally, when the sample processing system is in the cartridge processing position, the second channel valve actuator places the cartridge second channel valve in a closed configuration.

A channel valve actuator, as referred to herein in relation to the sample processing system, is any means for causing a valve included in the cartridge to move from an open to a closed configuration, and/or from a closed to an open configuration. Where the valve is a membrane valve as described above, the channel valve actuator may be any element capable of engaging with the channel exit aperture to displace the valve membrane so as to occlude the channel entry and/or exit aperture.

The or each receiving position may comprise means for influencing or manipulating sample contained in the corresponding chamber or well. For example, as well as or instead of heating and/or cooling means to provide temperature control, a position may comprise a moveable permanent magnet, or an electromagnet, to allow manipulation of magnetic particles or beads, or a magnetic stirrer, or may comprise a source of ultrasound or light, or may comprise means for physically shaking or agitating a chamber or well.

The cartridge engagement feature may be, for example, a channel formed in a body of the carriage unit, configured to receive the cartridge. For example, the carriage unit may comprise two opposing vertical side walls, each having a channel into which the cartridge may slide, in the manner of a drawer engaging with drawer runners. Alternatively, the cartridge engagement feature may be one or more tapered pegs that engage with a recess formed in the cartridge in order correctly align valve actuators with valve elements or receiving positions with wells, any of these being critical for correct operation. One such peg may additionally comprise a compressed air nozzle that may be used to connect an external compressed air source to the corresponding gas channel(s) within the cartridge.

Any arrangement of features may be utilised which allow engagement, preferably reversible engagement, between the cartridge and the carriage unit, and subsequent transition from a cartridge receiving position to a cartridge processing position. A cartridge engagement feature is, therefore, a structure capable of forming a cooperating relationship with at least a portion of the cartridge, to position the cartridge against or within the carriage unit, for example, so that a chamber or well may be correctly received by its corresponding receiving location.

In the sample processing system, the carriage unit may comprise a sample analysis well receiving position which is temperature controlled, wherein, in the cartridge processing position, the sample analysis well receiving position is in heating contact with the sample analysis well. In the cartridge receiving position, the sample analysis well receiving position is typically not in heating contact with the sample analysis well. This may be particularly desirable when a nucleic acid amplification reaction is to be carried out in the sample analysis well, so that one or more cycles of temperature change may be required to effect the reaction. Therefore, the sample analysis well position may provide a heat source which may alter under the control of an automated system, as is routine in the art, the sample analysis well position being in heating contact with the sample analysis well when the cartridge is associated with the carriage unit in the cartridge processing position, so that heat from the heat source is transferred to the material forming the sample processing well and hence to any sample contained in the well.

When the sample processing system comprises a cartridge comprising a sample receiving well, the carriage unit may comprise a sample receiving well receiving position which may optionally be temperature controlled. In the cartridge processing position, the sample receiving well receiving position may be in heating contact with the sample receiving well, as described above in relation to the sample analysis well receiving position. Likewise, where the sample processing chamber comprises a sample processing well, the carriage unit may comprise a sample processing well receiving position which may optionally be temperature controlled. In the cartridge processing position, the sample processing well receiving position may be in heating contact with the sample processing well.

When the sample processing system comprises a cartridge comprising a first cartridge body in which is formed the sample analysis well and at least a portion of one or more of the first and second channels, the carriage unit may comprise a sample receiving well receiving position which is temperature controlled and may also comprise a first channel valve actuator; wherein, in the cartridge processing position, the sample receiving well receiving position is in heating contact with the sample receiving well and the first channel valve actuator places the first channel valve in a closed configuration. The first channel may, alternatively or additionally, comprise a pin valve, which may be moved to the open configuration as desired.

The cartridge may comprise a first cartridge body in which is formed the sample analysis well and a second cartridge body in which is formed the sample entry location and a liquid-containing well connected by a sixth channel to the sample analysis well, the sixth channel being formed by a primary sixth channel portion formed in the first cartridge body and a secondary sixth channel portion formed in the second cartridge body, the first and second cartridge bodies being arranged to enable fluid connection between the primary and secondary sixth channel portions at a second junction, the second junction being occluded by a layer of flexible material or film positioned between the first and second cartridge bodies (for example affixed to a surface of the first cartridge body), wherein the first or second cartridge body comprises a junction pin positioned at the second junction and moveable from a first position to a second film-piercing position. In this case, when the sample processing system is in the cartridge processing position, the pin is in the second film-piercing position. This may be achieved by a pin-actuating element in the carriage unit contacting the junction pin and urging it from the first position to the second film-piercing position.

Any junction pin present within the cartridge may be moveable to the second film-piercing position by the action of a corresponding pin-actuating element in the carriage unit. The skilled person will understand, therefore, that the carriage unit may comprise more than one pin-actuating element, each positioned within the carriage unit so as to be capable of actuating a corresponding junction pin when the system is in the cartridge processing position. Advantageously, this enables the actuation of one or more junction pins, to enable liquid flow through a channel via a junction which is opened by the action of the junction pin, as described above, as a consequence of the transition of the sample processing system from the cartridge receiving position to the cartridge processing position. The carriage unit, in use, may be moveable in a progressive transition from the cartridge receiving position to the cartridge processing position, by the action of a user engaging the cartridge with the carriage unit and urging the system into the cartridge processing position. Therefore, the actuation of the junction pins during this transition provides an efficient means of opening some channels (for example, channels which are blocked by a film in order to isolate the first cartridge body of the cartridge from moisture until the cartridge is ready for use) without a requirement for additional energy or externally controlled actuation means.

Alternatively or additionally to the second junction pin valve, the secondary sixth channel portion may comprise a sixth channel valve which is reversible closable (for example, a membrane valve), the carriage unit comprising a sixth channel valve actuator, wherein, when the carriage unit is moved to the cartridge processing position, the sixth channel valve actuator places the sixth channel valve in the closed configuration.

In the sample processing system, the carriage unit may comprise a source of compressed gas which is in fluid connection with one or more channels of the cartridge when the carriage unit is in the cartridge processing position. Such a source of compressed gas may be instead of, or additional to, the optional feature of the source of compressed air in the cartridge, for example which may be provided by a subcontainer formed by engagement of a lid with a sample container, as outlined above. In the cartridge processing position, a first source of compressed air may be in fluid connection with a sample receiving and/or overflow well, when present in the cartridge, and/or a second source of compressed air may be in fluid connection with a liquid-containing well, when present in the cartridge. The first and second sources of compressed air may be the same source, separately connected to both the sample receiving and/or overflow well and the liquid-containing well.

Also described is a method or methods of processing samples of material in liquid or semi-solid form that involve their manipulation on a cartridge in a manner which is implicit in the corresponding description provided above. This method of processing may be performed with or without the aid of swabs and controllers as also described above and as implicit in the corresponding descriptions.

Therefore, a sixth aspect of the invention provides a method for processing a sample comprising the use of a system according to the fifth aspect of the invention, the method comprising the steps of:
  (a) obtaining a cartridge according to the first aspect of the invention comprising a sample receiving container in fluid connection with the first channel and a lid comprising a protruding distal portion which is formed to have mating dimensions with at least a portion of the interior (which may be defined by an interior surface) of the container, wherein the lid is sealingly connectable to the container via an interface configured to provide a progressive transition between open and closed configurations, further wherein, in the closed configuration, the protruding distal portion of the lid is in sealing contact with the interior (or interior surface) of the container;
  (b) introducing the sample into the sample receiving container;
  (c) engaging the cartridge with the carriage unit and urging it into the cartridge processing position; and
  (d) connecting the lid with the sample receiving container and urging the lid into the closed configuration, thereby generating a pressure in the closed sample processing chamber when the second channel valve is closed.

As mentioned above, the second channel valve actuator places the second channel valve in the closed configuration when the sample processing system is in the cartridge processing position. Steps (c) and (d) may occur sequentially, with either step occurring first, or simultaneously. For example, the transition of the carriage unit to the cartridge processing position may cause a lid actuating element in the carriage unit to engage the lid and urge it into the closed configuration once the carriage unit it in the cartridge processing position. If step (d) is to be conducted first, the cartridge comprises a first cartridge body and a second cartridge body being separated by a sealing layer or film, the first channel comprising a pin valve which remains in the closed configuration until the completion of step (c) (which is the step effective to close the second channel). Step (c) may also be effective to close a first channel valve when present in the first channel; this may be in addition to the pin valve mentioned in the preceding sentence.

The completion of step (d) urges sample present in the sample receiving container through at least part of the first channel (which may be through the primary first channel portion and into the sample receiving well, when these features are present) and seals the sample entry location so that sample may not flow backwards through the first channel (or through the primary first channel portion, when present). This results in an increased pressure in the sample processing chamber (or in the sample receiving well and/or the sample overflow well, when present), when the second channel valve is in the closed configuration. Therefore, the completion of step (d) causes sample to enter the interior of the cartridge via the first channel, additionally storing energy in the form of pressure which may then be utilised to move the liquid sample to other locations within the cartridge, when the second channel valve is opened.

Furthermore, when the sample receiving container and the lid (or the lid and an additional element of the cartridge, as described above) are mutually formed so that, when the lid is in the closed configuration, the lid and the container between them form a subcontainer comprising compressed air, the completion of step (d) isolates a volume of compressed air in the subcontainer. Again, this has the result that the action of closing the lid effectively stores energy within the cartridge in the form of compressed air, which may be released at an appropriate time by the opening of one or more valves in one or more channels, to facilitate the moving of liquid sample from one location in the cartridge to another location in the cartridge.

For example, when the cartridge comprises a seventh channel and/or an eighth channel, linking the subcontainer of compressed air to the sample receiving well and/or sample overflow well and/or the liquid-containing well or other buffer wells, when present, the cartridge may comprise a seventh channel valve and the carriage unit a seventh channel valve actuator, and/or the cartridge may comprise an eighth channel valve and the carriage unit an eighth channel valve actuator, and the completion of step (c) may cause the seventh channel valve actuator to place the seventh channel valve in a closed position and/or the completion of step (c) may cause the eighth channel valve actuator to place the eighth channel valve in a closed position.

Therefore, as mentioned above, a closable valve in the cartridge is generally a valve which defaults to the open position, until the cartridge is engaged with the carriage unit and the carriage unit is moved to the cartridge processing position, during which process the valve is moved to the closed position. This has the advantage that, while the cartridge is in storage prior to use, the valve remains open, reducing the likelihood that elements forming the valve might degrade in some way such that the valve becomes fixed.

When the valve is a membrane valve as described herein, the valve actuator in the carriage unit may comprise a valve closing element such as a ball capable of closing the membrane valve as outlined above, located in the carriage unit so that, when the cartridge and carriage unit have been engaged and moved to the cartridge processing position, the valve closing element engages with the membrane valve to close it. Therefore, the valve closing element, such as a ball, may be positioned in a vertical guideway and generally urged upwardly by a resilient member such as a spring, though retained in the vertical channel by the surrounding material or a thin flexible membrane located across the top opening of the vertical guideway. Such an arrangement is described in more detail below. When the process in which the system is to be used requires that a given valve be opened, an electromagnetic solenoid positioned under the valve closing element may be operated so as to draw the element downward, against the action of the spring, to remove the contact with the membrane valve and enable liquid to flow through the then-open valve, for example as a result of pressure created within the cartridge by the earlier movement of liquid, as described elsewhere herein. The valve may be returned to the closed position by de-activating the electromagnetic solenoid, such that the resilient member urges the valve closing element upwardly once more, to contact and close the membrane valve.

As with other features described herein, the use of a valve actuator which comprises a valve closing element which is urged to contact the membrane valve by the action of a spring, when the carriage unit is in the cartridge processing position, has the effect that the energy of the user, in initially engaging the cartridge with the carriage unit and urging it to the cartridge processing position, simultaneously causes the valve(s) to move from the open to the closed position. Additional external energy is not required in order to effect this change, or to maintain the valves in the closed position. A small amount of external energy is required to operate the electromagnetic solenoid when a valve is to be moved to the open position, but this is minimal. Therefore, the additional energy requirements of the system when in use are minimised. Furthermore, the components of the system are relatively simple, without the need for complex circuitry to provide an actively actuated valve system.

As mentioned, the cartridge may be one which comprises a first cartridge body and a second cartridge body and at least one channel formed by a primary channel portion formed in one cartridge body and a secondary channel portion formed in the other cartridge body, the first and second cartridge bodies being arranged to enable fluid connection between the primary and secondary channel portions at a channel junction, the cartridge comprising a layer of flexible material positioned across a surface of the first cartridge body and separating the primary channel portion from the secondary channel portion, the first or second cartridge body comprising a pin positioned at the channel junction and moveable from a first position to a second film-piercing position. When the cartridge is in this form, the method may comprise the moving of the pin from the first position to the second film-piercing position by the completion of step (c); for example this may be utilised to open a pin valve in the first channel.

Therefore, the method according to the sixth aspect of the invention may be a method for detecting the presence of an analyte in a sample, the method comprising the steps of:
  (a) obtaining a cartridge as described above, comprising a sample receiving container and having a sample processing chamber comprising a meter well and a meter overflow well, the cartridge also comprising a detection location comprising a lateral flow device (LFD), the cartridge also comprising a fluid-containing well, the cartridge further comprising a first cartridge body and a second cartridge body joined to the first cartridge body, the two bodies being separated by a sealing layer (which may form part of a bag surrounding the first cartridge body), the first cartridge body comprising at least the LFD and sample analysis well and the second cartridge comprising at least the fluid-containing well;

(b) introducing the sample into the sample receiving container (optionally to be combined therein with lysis reagent and/or other reagents);

(c) engaging the cartridge with the carriage unit and urging it into the cartridge processing position, causing the second channel valve actuator to engage with the second channel valve and move it to the closed position, and causing a sixth channel valve in the sixth channel connecting the diluent well to the sample analysis well to be actuated to the closed position by a sixth channel valve actuator in the carriage unit;

(d) connecting the lid with the sample receiving container and urging the lid into the closed configuration, causing sample to move into the cartridge via the first channel to fill the meter chamber and create an internal pressure in the closed meter overflow well (steps (c) and (d) being conducted sequentially in either order, or simultaneously);

(e) causing the second channel valve to be opened by operation of the second channel valve actuator, allowing the analytic sample in the meter well to be urged, under the force of the pressure in the meter overflow well, to move through the second channel to the sample analysis well, the sample analysis well comprising dried reagents necessary to effect a nucleic acid amplification reaction when in liquid form, the dried reagents being reconstituted to liquid form in the analytic sample when it enters the well;

(f) causing the second channel valve to be closed (for example, after a pre-determined period of time) by operation of the second channel valve actuator;

(g) applying at least one temperature change (which may be provided as a thermocycle) to the sample analysis well, to effect a nucleic acid amplification reaction in the analytic sample contained therein (for example, if the nucleic acid amplification is to be achieved by a PCR reaction, a series of temperature changes will be required, as is well understood in the art);

(h) causing the sixth channel valve to be opened and causing diluent from the fluid-containing well to flow through the sixth channel connecting the fluid-containing well with the sample analysis well, to flood the sample analysis well and urge the contents thereof on onto the LFD, where a detectable signal is generated to determine the presence of the analyte in the sample.

Step (d) may also create a subcontainer of compressed air formed between the lid and the sample receiving container. Step (c) may also comprise forming a fluid connection which is an eighth channel extending between the fluid-containing well and the subcontainer of compressed air, if present, or forming a fluid connection between the fluid-containing well and another source of compressed air, the fluid connection comprising a valve which is in the closed position when step (c) is completed. Step (h) may, therefore, comprise the actuation of the valve (which may be a pin valve or a membrane valve) to the open position, allowing the air pressure to cause fluid (such as diluent) to move from the fluid-containing well to flow through the sixth channel connecting the fluid-containing well with the sample analysis well.

In another arrangement, the method according to the sixth aspect of the invention may be a method for detecting the presence of an analyte in a sample, the method comprising the steps of:

(a) obtaining a cartridge as described above, comprising a sample receiving container, a sample receiving well and a sample processing chamber comprising a meter well and a meter overflow well, the cartridge also comprising a detection location comprising a LFD and a fluid-containing well, and also comprising a mixing well, the cartridge further comprising a first cartridge body and a second cartridge body joined to the first cartridge body, the two bodies being separated by a sealing layer (which may form part of a bag surrounding the first cartridge body), the first cartridge body comprising at least the LFD and sample analysis well and the second cartridge comprising at least the fluid-containing well;

(b) introducing the sample into the sample receiving container (optionally to be combined with lysis reagent and/or other reagents);

(c) connecting the lid with the sample receiving container and urging the lid into the closed configuration, causing sample to move into the cartridge via the first channel to fill the sample receiving well, to be combined with further reagents and/or buffers if present;

(d) engaging the cartridge with the carriage unit and urging it into the cartridge processing position, causing the second channel valve actuator to engage with the second channel valves and move it to the closed position, and causing a first channel valve (in the secondary first channel portion connecting the sample receiving well with the sample processing chamber) to be actuated by a first channel valve actuator in the carriage unit to move it to a closed position, and causing a causing a sixth channel valve (in the sixth channel connecting the diluent well to the sample analysis well) to be actuated by a sixth channel valve actuator in the carriage unit to move it to a closed position, and also causing a pin valve in the secondary first channel portion to be opened;

(e) causing the sample receiving well to be heated by operation of a controlled heating element in the sample receiving well receiving position to encourage lysis of the raw sample;

(f) causing the first channel valve to be opened by operation of the first channel valve actuator, allowing the then-lysed raw sample (now initial sample) in the sample receiving well to flow to the meter well and create an internal pressure in the closed meter overflow well;

(g) causing the first channel valve to be closed after a pre-determined period of time by operation of the first channel valve actuator;

(h) causing the second channel valve to be opened by operation of the second channel valve actuator, allowing the analytic sample in the meter well to be urged, under the force of the pressure in the meter overflow well, to move through the second channel to the sample analysis well, the sample analysis well comprising dried reagents necessary to effect a nucleic acid amplification reaction when in liquid form, the dried reagents being reconstituted in the analytic sample when it enters the well;
(i) causing the second channel valve to be closed after a pre-determined period of time by operation of the second channel valve actuator;
(j) applying at least one temperature change (which may be provided as a thermocycle) to the sample analysis well, to effect a nucleic acid amplification reaction in the analytic sample contained therein (for example, if the nucleic acid amplification is to be achieved by a PCR reaction, a series of temperature changes will be required, as is well understood in the art);
(k) causing the sixth channel valve to be opened and causing the liquid from the fluid-containing well to flow through the sixth channel connecting the fluid-containing well with the sample analysis well, to flood the sample analysis well and urge the contents thereof on through the mixing well onto the LFD, where a detectable signal is generated to determine the presence of the analyte in the sample.

Steps (c) and (d) may be conducted sequentially in either order, or simultaneously. Step (c) may also create a subcontainer of compressed air formed between the lid and the sample receiving container. Step (d) may also comprise forming a fluid connection which is an eighth channel extending between the fluid-containing well and the subcontainer of compressed air, if present, or forming a fluid connection between the fluid-containing well and another source of compressed air, the fluid connection comprising a valve which is in the closed position when step (d) is completed. Step (k) may, therefore, comprise the actuation of the valve (which may be a pin valve or a membrane valve) to the open position, allowing the air pressure to cause liquid to move from the fluid-containing well to flow through the sixth channel connecting the diluent well with the sample analysis well.

In a further arrangement, the method according to the fifth aspect of the invention may be a method for detecting the presence of an analyte in a sample and may comprise the steps of:
(a) obtaining a cartridge according to the first aspect of the invention comprising a sample receiving container in fluid connection with the first channel;
(b) obtaining a sample swab device according to the third aspect of the invention wherein the first end of the rod comprises a sample collection tool or material;
(c) obtaining a sample using the sample collection tool or material;
(d) introducing the first end of the rod of the sample swab device into the sample receiving container;
(e) engaging the cartridge with the carriage unit and urging it into the cartridge processing position; and
(f) connecting the sample swab device container lid with the sample receiving container and urging the lid into the closed configuration.

Steps e) and f) may be performed in either order.

As mentioned previously, from these descriptions it can be understood that, in any embodiment of the present invention, much of the energy required for the completion of the various steps is stored within the cartridge in the form of pressure generated by the step when the sample is urged into the cartridge by the action of closing the lid and optionally the step when an additional compressed air reservoir either on the cartridge or in the controller may be compressed. A pressure is generated at least in the closed sample processing chamber (which, in some specific methods outlined above, may include a meter well and closed meter overflow well) and optionally also, as described above, in the subcontainer of compressed air which is formed by the coming together of the first and second subcontainer portions in the lid and container. Furthermore, various channel valves are placed in the closed position by the action of moving the carriage unit to the cartridge processing position, with only a small amount of additional external energy being required to open each valve, when required. The sequence of valve opening can be selected so as to utilise the pre-stored energy, in the form of pressure as outlined above, to move the liquid sample around the cartridge as desired for the implementation of various sample handling and processing steps. This provides a low-cost, simple to use system which can be operated without a high level of training, with only a requirement for very small amounts of external energy. Furthermore, although a simple electronic control circuit is required, there is a significant reduction in the requirement for circuitry and control systems, which would otherwise be required to introduce air from external sources in order to move liquid around the device, as required by many prior art systems.

In any embodiment of the sixth aspect of the invention, the method may be a method of detection of a target nucleic acid in a sample comprising introducing a sample into the cartridge, conducting a nucleic acid amplification reaction and detecting the target nucleic acid, for example by use of an LFD or by detection of amplified copies of the target nucleic acid tagged with fluorescent labels, if present. The method may alternatively be a method of detection of an analyte in a sample comprising exposing the sample to an antibody capable of binding to the analyte, the antibody being provided in the sample analysis well and/or sample detection location, when present. The method may alternatively be a method of detection of an analyte in a sample comprising exposing the sample to a reagent which undergoes a change when in the presence of the analyte, for example a colour change or a state change (e.g. a change from a liquid to a solid).

The analyte may be contained in a sample which is obtained from an environmental source, such as a water or soil sample, or a sample which is obtained from or which contains a prokaryotic or eukaryotic organism, such as a suspension of bacterial cells. It is particularly envisaged that the analyte may be contained in a biological sample obtained from a plant or an animal. The animal may be a ruminant, camelid or suid animal such as a bovine or swine animal, for example, a cow, pig, sheep or goat, or may be a human being. The biological sample may be a blood, plasma, serum, urine, faecal, tissue, saliva or milk sample. Alternatively, the sample may be prepared from a sample of cells (for example, in the manner of a cheek or vaginal swab) or to obtain a tissue sample (for example in the manner of a biopsy), which may then be processed to a raw sample for introduction into the sample receiving container by washing or elution from a device or apparatus used to obtain the sample. For example, this may be achieved using the sample swab device described above.

Throughout the description and claims of this specification, the words "comprise" and "contain" and variations of the words, for example "comprising" and "comprises", mean "including but not limited to" and do not exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Preferred features of each aspect of the invention may be as described in connection with any of the other aspects. Other features of the present invention will become apparent from the following examples. Generally speaking, the invention extends to any novel one, or any novel combination, of the features disclosed in this specification (including the accompanying claims and drawings). Thus, features, integers or characteristics described in conjunction with a particular aspect, embodiment or example of the invention are to be understood to be applicable to any other aspect, embodiment or example described herein, unless incompatible therewith.

Moreover, unless stated otherwise, any feature disclosed herein may be replaced by an alternative feature serving the same or a similar purpose.

BRIEF DESCRIPTION OF DRAWINGS

Embodiments of the invention will now be described, by way of example only, with reference to the following FIGS. 1-23 in which:

FIG. 10 shows a membrane valve and membrane valve actuator;

FIG. 14 shows a top perspective view (FIG. 14A) and a bottom perspective view (FIG. 14B) of a part of a controller for engagement with the cartridge;

DETAILED DESCRIPTION

Figure 1:
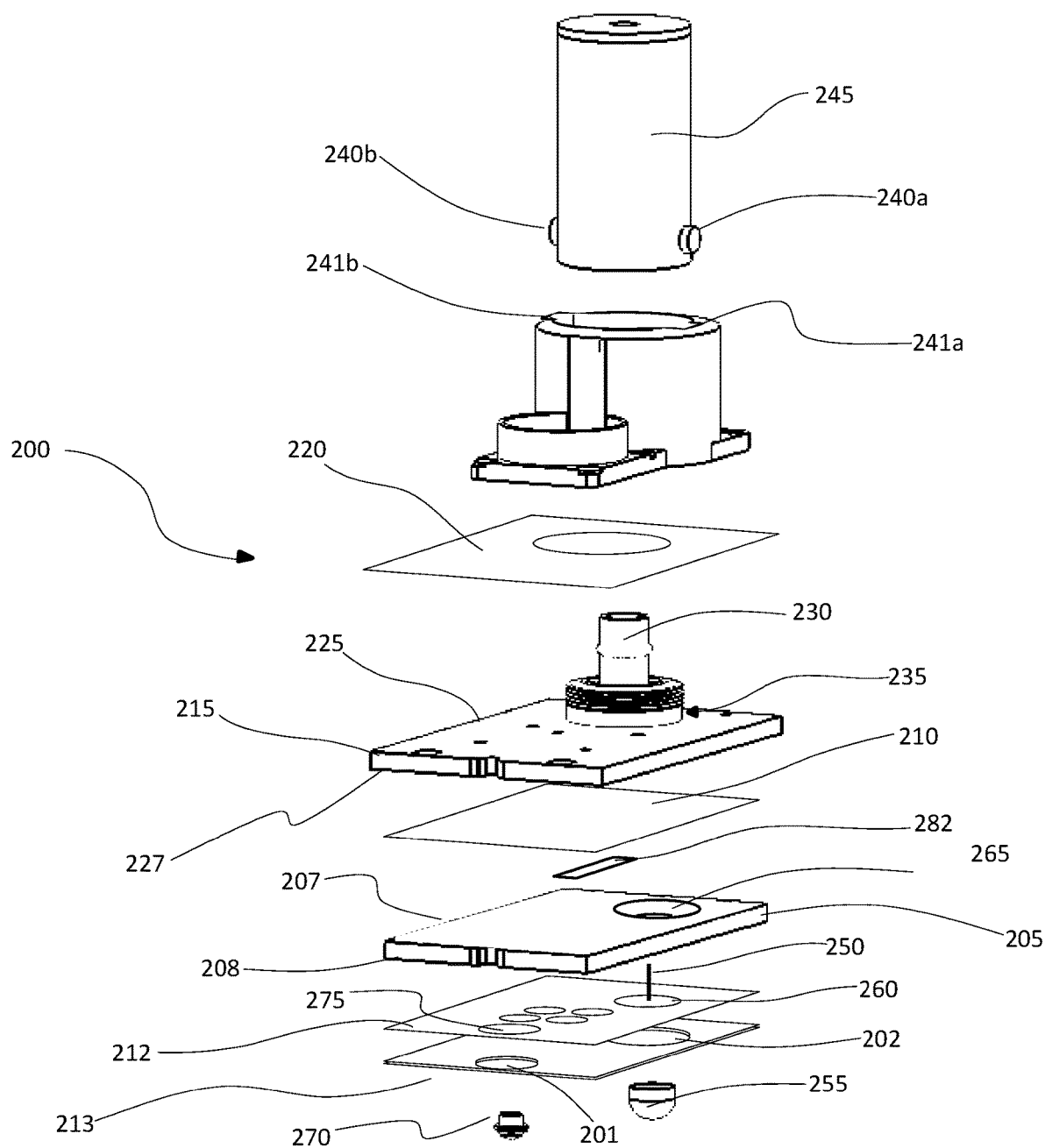
FIG. 1 shows an exploded view of a cartridge according to the invention.

FIG. 1 shows an exploded view of a cartridge 200 according to the invention. The device comprises a first body 205 which contains regions of the cartridge which are required to be kept isolated from moisture prior to use. This is achieved by application across the top surface 207 of the first body 205 of a sealing membrane 210 which may form part of a bag (not shown) which also encompasses the rest of the first body 205. Holes may be formed at appropriate locations in membrane 210 by means of pin valves described elsewhere herein, to allow communication between wells and channels in the first and second bodies, which would otherwise be blocked by the presence of the membrane 210.

An adhesive membrane 212 may also be applied across the lower surface 208 of the first body 205, which may be utilised to affix an elastomeric membrane 213 across the bottom of the body 205. The elastomeric membrane 213 comprises holes 201 and 202 to allow the amplification well 270 and sample well 255, respectively, to engage with the body 208. This membrane 213 is utilised to generate membrane valves, as described herein. The sample receiving well 255 may optionally be connected to a closed or compressible sample overflow well 259 by a fifth channel 257.

Various wells and channels (not shown) are formed in the top surface 207 of the first body 205, as will be discussed in more detail with reference to FIG. 3.

The cartridge further comprises a second body 215 which houses various wet reagents, as will be described with reference to FIG. 2. The second body 215 has an upper surface 225 and a lower surface 227. In the assembled cartridge 200 the second body 215 is affixed as a layer on top of the first body 205, the layers separated by the sealing membrane 210. A further sealing membrane 220 also sits across the top surface 225 of the second body 215.

A container 230 is engaged with the second body 215 at a sample entry position 235 (the region of which is indicated with a dotted line in FIG. 2A, to show the region of engagement of the container 230 with the second body 215). The container 230 further comprises an exterior housing 232 which can provide means for engagement of the lid with the container, and/or spaces into which excess air or liquid from the interior of the device may be directed. The container 230 also comprises a lid 245 which can engage with and seal the container 230, in this case by engagement with the exterior housing 232. Lugs 240a and 240b on the exterior of the lid engage as a bayonet fit with grooves 241a and 241b formed in the exterior housing 232 of the container 230, to facilitate engagement and closure of the lid.

Sample added to the container 230 is forced into well 255 through tube 250, as a consequence of the pressure generated by the closing of the lid 245. Air contained within the well 255 can escape via hole 500 through well 505 and out through port aperture 510 which leads to port 515, which extends through the lower surface 227 of the second body 215 and through the first body 205 to port connection 520.

A valve at 305 is kept in the closed position (described further below) until it is desired to move sample from the well 255 to another location in the device. At that point, port connection 520 is connected to a source of compressed air and the valve at 305 opened, so that sample in well 255 is forced upwardly through the tube 250 which extends to the bottom of the well 255. The tube is connected at its top end to a channel 290 via entry point 300 as described below in relation to FIG. 2. There is a clearance hole 260 in the adhesive layer 212 and a further clearance hole 265 (seen in FIG. 3) in the first body 205, to allow the material of the well 255 to extend through the latter to engage with processing apparatus, for example in a carriage unit as described below, to enable heating or other manipulation of the well 255 and, therefore, of any sample contained within it.

FIG. 1 also shows the amplification well 270 which is engaged with the lower surface 208 of the first body 205, through holes 201 and 275 formed in the membrane layer 213 and sealing layer 212 respectively. In addition, the Figure shows a wick material 282 which will sit in the base of the meter overflow well 315 when the sealing membrane 212 is in position across the lower surface 208 of the body 205.

Figure 2:
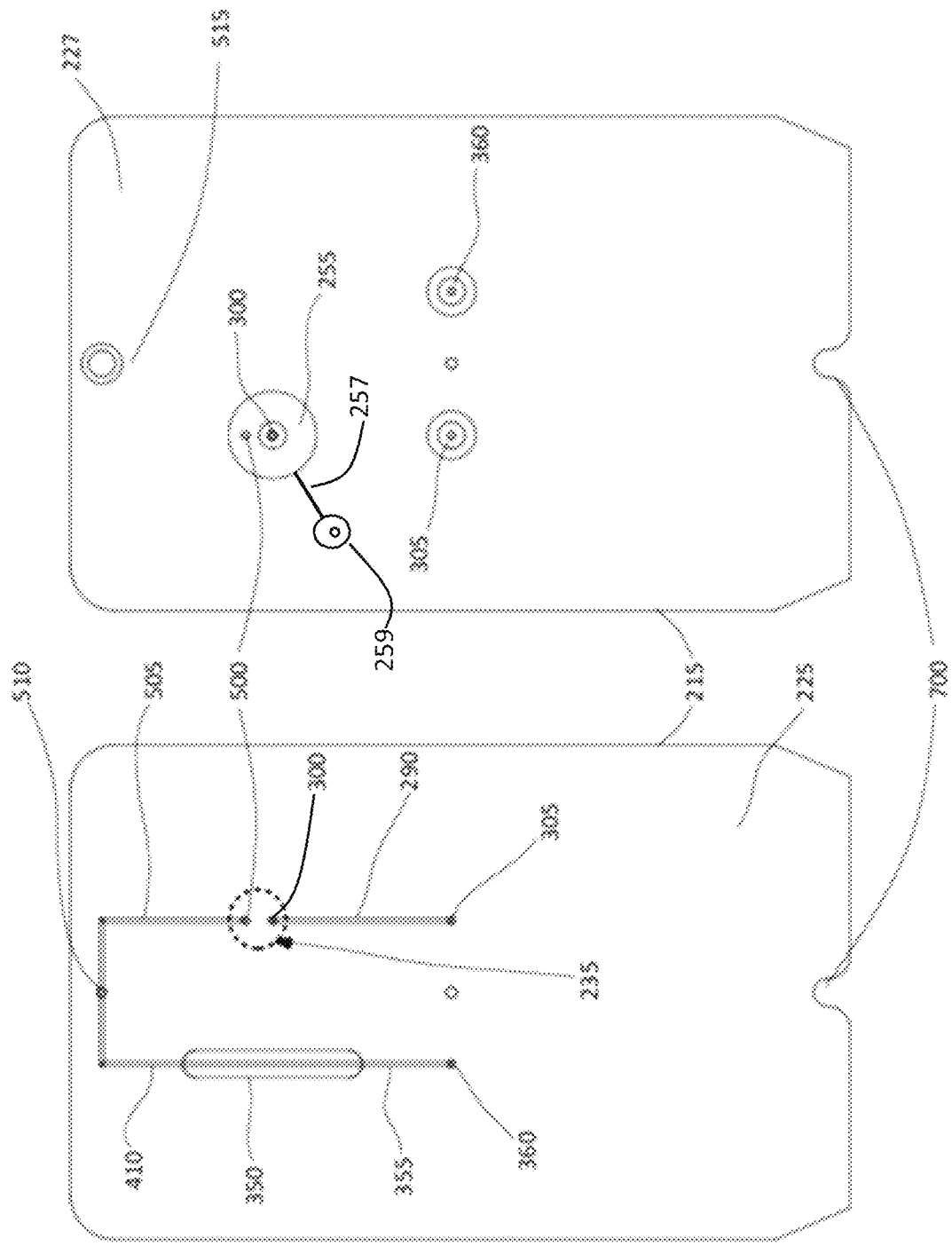
FIG. 2 shows top and bottom view of one layer of the cartridge of FIG. 1, with FIG. 2A being a view from above and FIG. 2B being a view from beneath.

FIG. 2 shows views of the second cartridge body 215, with FIG. 2A being a view of the top surface 225 and FIG. 2B being a view of the lower surface 227.

Figure 3:
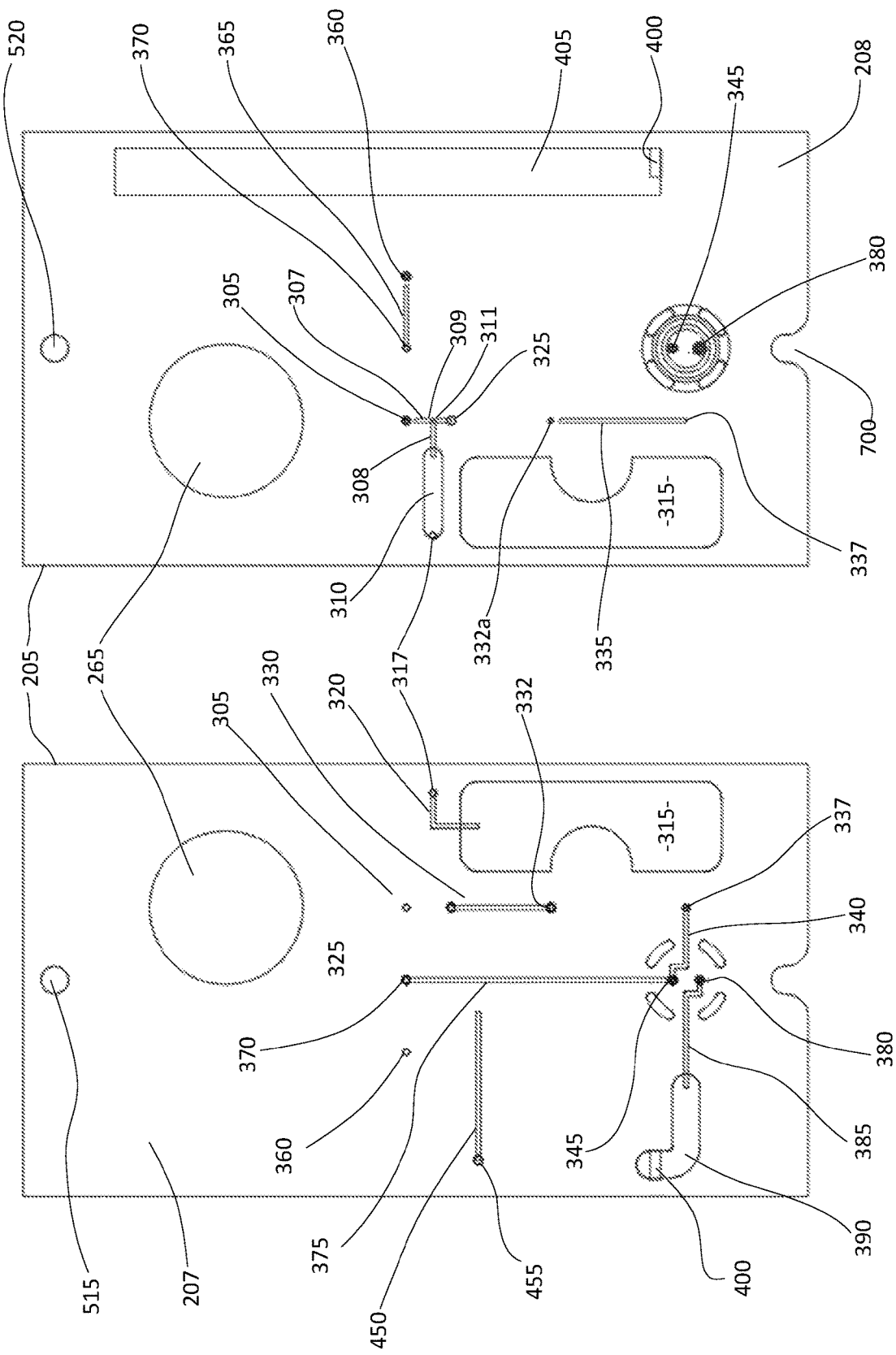
FIG. 3 shows top and bottom view of another layer of the cartridge of FIG. 1, with FIG. 3A being a view above and FIG. 3B being a view from beneath.

FIG. 3 shows views of the first cartridge body 205, with FIG. 3A being a view of the top surface 207 and FIG. 3B being a view of the lower surface 208.

As mentioned above, liquid exits the well 255 by being forced upwardly through tube 250 via entrance aperture 300, shown in FIG. 2. This is the entrance to channel 290 which is formed in the upper surface 225 of the second body 215, as shown in FIG. 2A. Channel 290 extends to aperture 305 extends through both body 215 and body 205, to valve seat 305a which may be contacted by a valve actuator, through the intervening elastomeric membrane 213; hole 305 and valve seat 305a between them form valve 305/305a. When open, valve 305/305a joins channel 290 to channel 307 which is formed in the lower surface 208 of body 205. Channel 307 is joined to channel 308 at junction 309; therefore, between them these channels join the sample receiving well 255 to the meter well 310. The meter well 310 is further joined to meter overflow well 315 by the channel 320, both of which are formed in the top surface 207 of the body 205, via the hole 317 which extends between the lower and upper surface.

The meter well 310 is also joined to the amplification well sequentially by channel 308, junction 309, channel 311, hole 325 into channel 330, formed in the top surface 207 of the body 205. Hole 332 is part of a membrane valve having a valve seat 332a formed in the lower surface 208 of the body 205, the valve seat being contactable by a valve actuator, through the intervening elastomeric membrane 213; hole 332 and valve seat 332a between them form valve 332/332a. When open, valve 332/332a extends between the upper and lower surfaces to join channel 330 to channel 335, formed in the lower surface 208. Channel 335 in the lower surface 208 joins channel 340 (in the upper surface 208) via hole 337, with channel 340 opening into amplification well 270 via hole 345.

A diluent reservoir 350 is located in the top surface 225 of second body 215, as shown in FIG. 2A. The reservoir 350 is joined to the amplification well 270 by means of a channel 355 which terminates at hole 360 which forms the junction between the body 215 and the body 205, with hole 360 opening into channel 365 formed in the lower surface 208 of the body 205 (FIG. 3B). Hole 360 is part of a membrane valve having a valve seat 360a formed in the lower surface 208 of the body 205, the valve seat being contactable by a valve actuator, through the intervening elastomeric membrane 213; hole 360 and valve seat 360a between them form valve 360/360a. The valve 360/360a links channel 355 with channel 365, which is in turn linked to channel 375 formed in the upper surface 207 of body 205, via a hole 370 extending from the lower surface 208 to the upper surface 207. Channel 375 opens into the amplification well 270 via the hole 345, which also joins channel 240 to the well.

Hole 380 serves as the entry aperture into channel 385 which links the amplification well to a non-linear mixing chamber 390. When the device is in use, sample is moved to this chamber by the action of urging diluent from well 350, through channels 355 and 375 to "flood" the contents of the amplification well 270 and move the contents thereof into the mixing well 390 via channel 385. The shape of the well 390 enables mixing of the diluent with the previous contents of the amplification well 270. The mixed liquid can then pass on through hole 400 which extends between the upper surface 207 and lower surface 208 of the body 205. This hole links the mixing well 390 with a LFD membrane positioned in the LFD location 405.

Channel 450 is formed in the upper surface 207 of the body 205 and is in fluid connection with the LFD location 405, enabling air present in the LFD location 405 to leave, if necessary, under the pressure of liquid entering via the hole 400. Air may move from channel 450 through hole 455, either to the exterior of the cartridge, or to an air reservoir contained elsewhere on the cartridge or to a reservoir in an external body which may be connected to hole 455.

The sealing membrane 210 may be pierced at holes 305 and 360 by use of pin valves described elsewhere herein.

Therefore, in use, sample is added to the container 230 and is forced downwardly into well 255 by the action of closing the container 230 with the lid 245. Pin valve at the top of hole 305 is in the closed (non-pierced) position during the action of introducing sample into the cartridge, so that any excess air in the well exits via channel 505, to flow through port aperture 510, port 515 and port connection 520. Sample may be processed in the well 255, for example by heating to induce cell lysis. The cartridge may be connected to a source of compressed air via port connection 520 and valve 305/305a may be opened. On application of air from the compressed air source, through channel 505, forces sample in well 255 upwardly through tube 250 into channel 290. The sample passes through valve 305/305a into channel 307. Since the valve at 332/332a is closed, sample has no option but to move through junction 309 into channel 308 and into meter well 310. Once meter well 310 is full, sample overflows via hole 317 and channel 320 into overflow well 315, creating an increased pressure within this well. The valve 305/305a is then moved to a closed position. When the valve 332/332a is moved to an open position, the release of pressure allows the metered volume of sample in well 310 to move through channel 308, junction 309, channel 311, hole 325, channel 330, hole 332, channel 335, hole 337, channel 340 and hole 345, to enter amplification well 270, which may comprise freeze-dried reagents required for a nucleic acid amplification reaction. These reagents are reconstituted on contact with the liquid sample when it enters the well. The valve 332/332a is moved to a closed position. The well may then be heated, at a constant temperature or in a thermocycle, to facilitate amplification of a target nucleic acid sequence in the sample.

Once the time required for the amplification reaction has elapsed, the valve 360/360a may be opened and a source of compressed air brought to bear, via channel 410 shown in FIG. 2A, on the contents of diluent well 350. Diluent contained in the well moves under the pressure of the air through channel 355, hole 360, channel 365, hole 370, channel 375 and hole 345 to enter amplification well 270. Since the valve 332/332a is closed, the liquid is obliged to flood well 270 and force the contents of the well on through hole 380 and channel 385 into mixing well 390. The fact that the well has a bend in its axis facilitates mixing, before the mixed liquid proceeds though hole 400 onto the bibulous membrane of the LFD located in the LFD location 405. The LFD comprises means for visualising the presence of target nucleic acid amplified in the amplification reaction, so that the presence or absence of the target nucleic acid in the sample can be determined.

The previous description provides an example of one combination of features which may be included in a cartridge according to the invention, although the skilled person will understand that some features may be removed, or additional features added, according to the type of sample to be processed and/or the type of process and/or detection method to which the sample is to be subjected.

Figure 4:
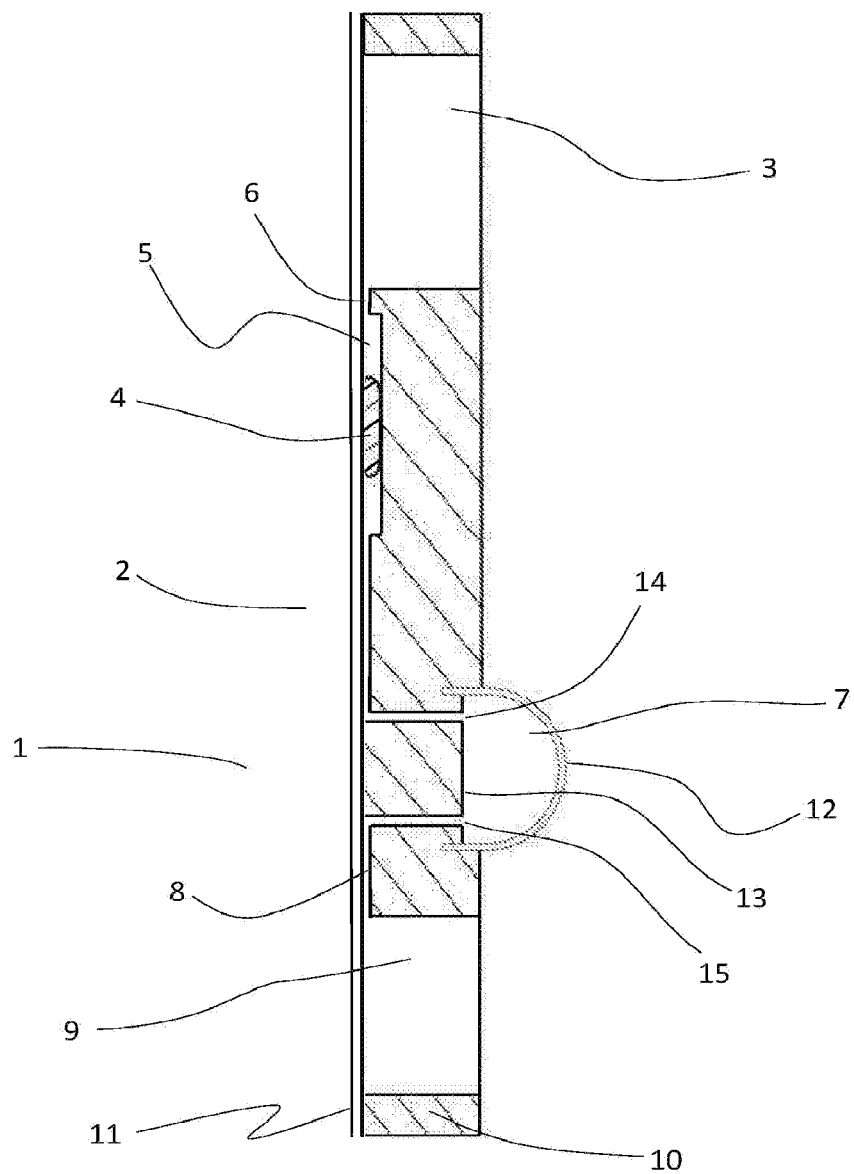
FIG. 4 shows a detailed cross-section of a portion of a fluid manipulation cartridge according to the invention.

For example, a further arrangement of features in a fluid manipulation cartridge according to the invention is shown as 1 in FIG. 4. It contains a chain 2 of fluidically connected fluid control features including a first chamber 3, a small volume of liquid 4 located at a first position 5, a primary channel 6 an intermediate well 7 a secondary channel 8 and a second overflow chamber 9.

The cartridge is fabricated from a substrate material 10 a cover sheet 11 that encloses several of the features and a bulb 12 that forms intermediate well 7.

As described above in relation to meter well 310 and meter overflow well 315, if the air pressure in first chamber 3 exceeds that of second chamber 9 there is a differential pressure difference across the liquid volume that will cause it to flow towards the second chamber. The well 7 is equivalent to meter well 310 in the previously described arrangement, the chamber 9 is equivalent to meter overflow well 315, the chamber 3 is equivalent to well 255. Channel 8 is equivalent to channel 320. Features 5 and 6 between them provide the same function as channels 290, 307 and 308 between them, i.e., linking well 255 (equivalent to 3) to well 310 (equivalent to 7).

In the configuration shown in FIG. 4, it will be appreciated that, if the volume of liquid 4 at the initial location 5 is greater than the internal volume of intermediate well 7, an aliquot will be trapped in well 7 but the excess will continue to flow towards second overflow chamber 9. Said flow will continue until it is interrupted by some means (described later) or until the differential pressure is insufficient to overcome viscous forces acting on the liquid. Furthermore, if as may be the case, surplus pressurised air continues to flow after the liquid volume from first chamber 3 through intermediate well 7, the precise amount of liquid retained in well 7 could vary between successive runs, or between different cartridges. This variation is caused by the surface tension properties of the liquid and the geometry of the substrate face 13 extending into well 7 as air attempts to pass through the liquid from inlet port 14 to outlet port 15.

Figure 5:
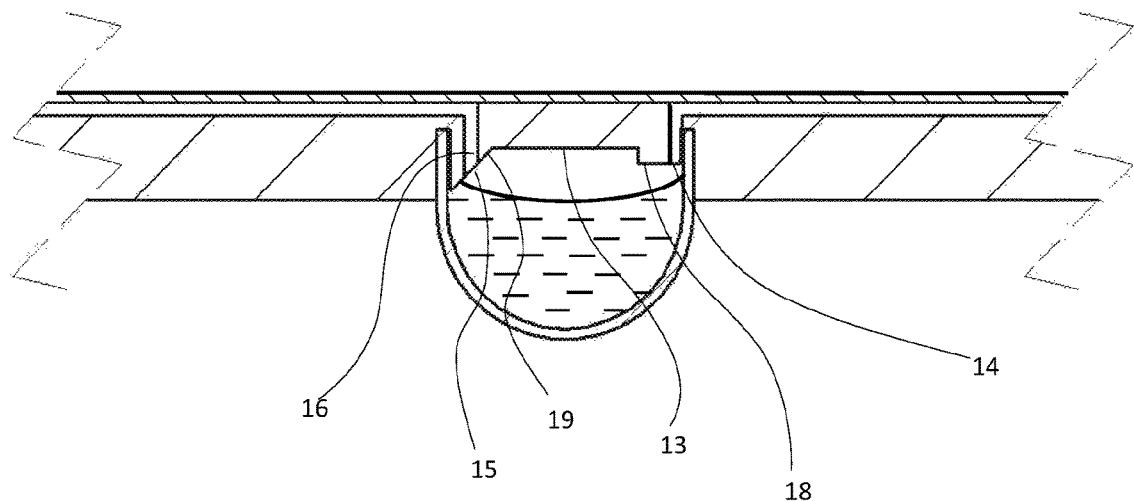
FIG. 5 shows an improved geometry of an intermediate fluid well contained within the cartridge.

FIG. 5 shows an improved design of the substrate face 13 whereby inlet and outlet ports 14, 15 are contained within features that reach deeper into the well than the surrounding substrate face 13. As liquid flows into the well through the inlet port 14 it drops under gravity to fill the well, upwards from the bottom. As shown, inlet port 14 is improved if incoming liquid makes direct contact with the inner wall of well 7 and is contained within a small first protrusion 18 or other feature that helps to disrupt the meniscus of any drops that might otherwise tend to develop and spread. As the well fills with liquid, the meniscus ultimately reaches second protrusion 16 and liquid will flow into the outlet port 15 leaving a headspace of air 17. When the entire volume of liquid 4 has entered and passed through the well 7 in this manner and air continues to flow into the well from inlet port 14, it will break the meniscus of liquid around the protrusion 16 to reach the outlet port 15. It will be noted that inlet port 14 is at a higher level than outlet port 15 so that air can enter via the inlet port 14 above the meniscus when it has risen to the level of outlet port 15. The angled face 19 of protrusion 16 facilitates said breaking of the meniscus. By virtue of the features described, including angled face 19, the aliquot of liquid remaining in well 7 has a more consistent volume than would be achieved in a design that lacked these details.

It will be appreciated that small features such as this are readily produced by injection moulding which is the favoured manufacturing method for producing substrate components in high volume. Such an arrangement may be used with any well described in the present specification, which requires both an entry point and an exit point for liquid to flow into an out of the well.

Cartridges according to the current invention may be used for a variety of purposes, but the inventors have implemented them in diagnostic tests for micro-organisms in applications such as infectious disease testing. Such applications range from human clinical and veterinary diagnostics to testing for bio-warfare agents.

In applications such as these, the volumes of liquid involved may be very small, frequently consisting of between 10 and 50 microlitres. The cross-sectional area of suitable flow channels is typically between 0.005 and 1.0 $mm^2$, but preferably between 0.01 and 0.1 $mm^2$. The inventors have also found that suitable pressure differential levels to generate relatively slow, but controllable motion of liquid volumes may be in the region of 10 to 100 mbar, preferably between 30 and 70 mbar. The resulting flows have very low Reynold's numbers and thus tend to be deeply within the laminar flow regime unless disrupted by sharp or rough internal features such as abrupt edges.

Figure 6:
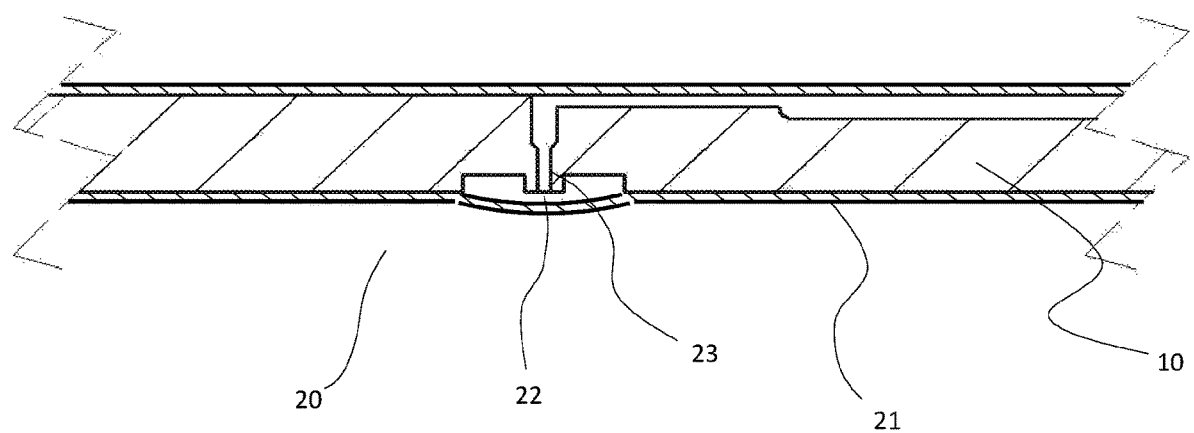
FIG. 6 shows a membrane valve element.

FIG. 6 shows a further development of the same cartridge including a membrane valve element 20 formed by an elastomeric membrane 21 extending over the opening 22 of a 'via' hole 23 at the surface of the substrate material 10. This may be the arrangement used, for example, to provide the membrane valves 305/305a, 332/332a and 360/360a described above in relation to FIGS. 1-3.

Figure 7:
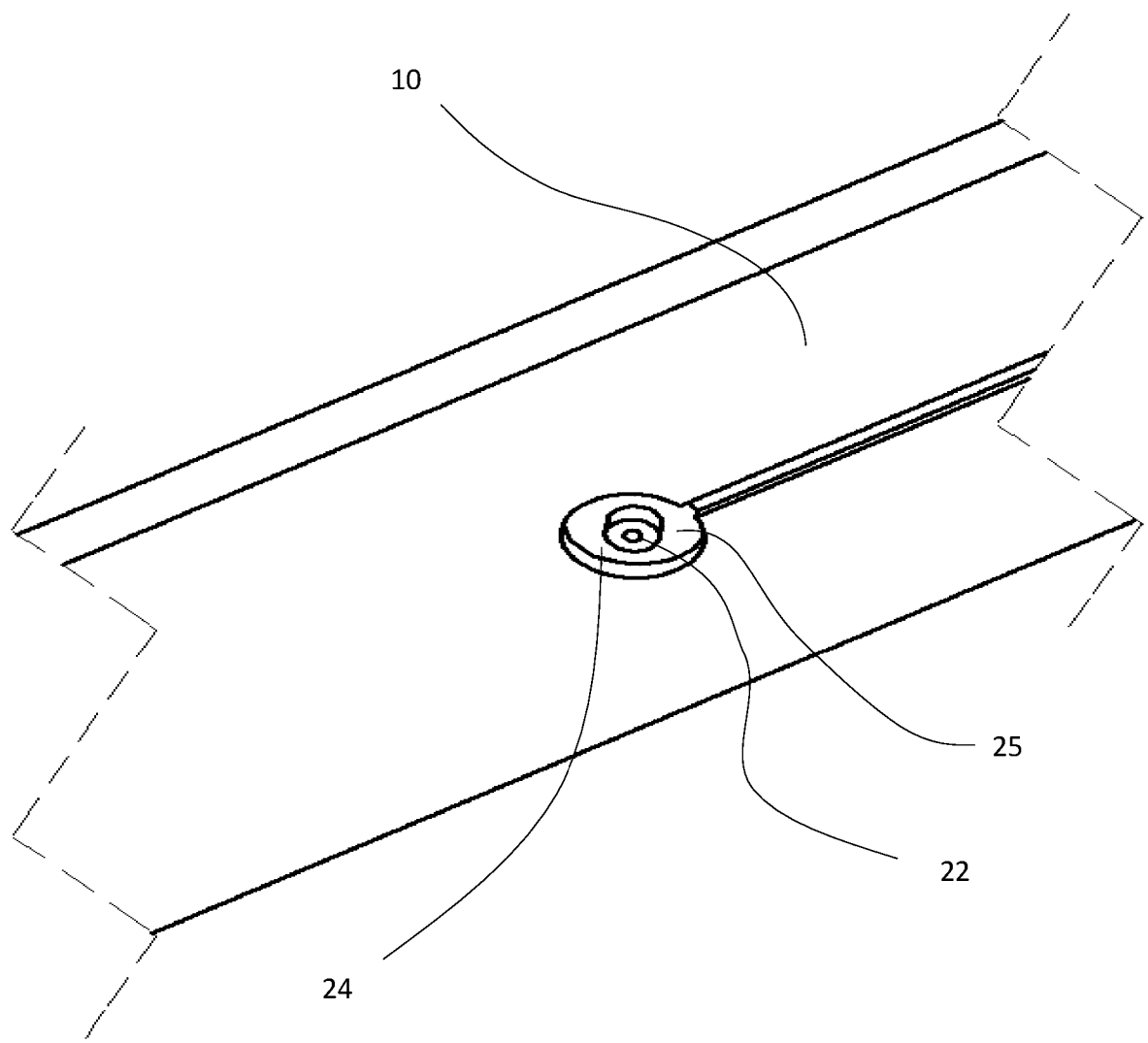
FIG. 7 shows a membrane valve seat.

FIG. 7 shows the same valve element within a fragment of substrate material 10 but illustrates further detail including a valve-seat 24 (the elastomeric membrane 21 not shown in this Figure) comprising opening 22 surrounded by an annular recess 25. This arrangement may be used for the valve seats 305a, 332a and 360a described above.

In applications such as the diagnostic cartridges described, the inventor has also found that the valve features can be optimised by the use of design details such as: valve hole opening of around 0.3 to 0.7 mm diameter; elastomeric membrane material of approximately 0.2 to 0.4 mm thickness and around 40 shore hardness, such as thin silicone sheet.

To open and close such a membrane valve feature, it is necessary that membrane 21 is compressed against valve seat 24 in order to obstruct flow through hole 22. Details of the actuation of such valves is provided below, where attention turns to the associated control unit. See FIGS. 10, 11 and 14 and the associated text.

Figure 8:
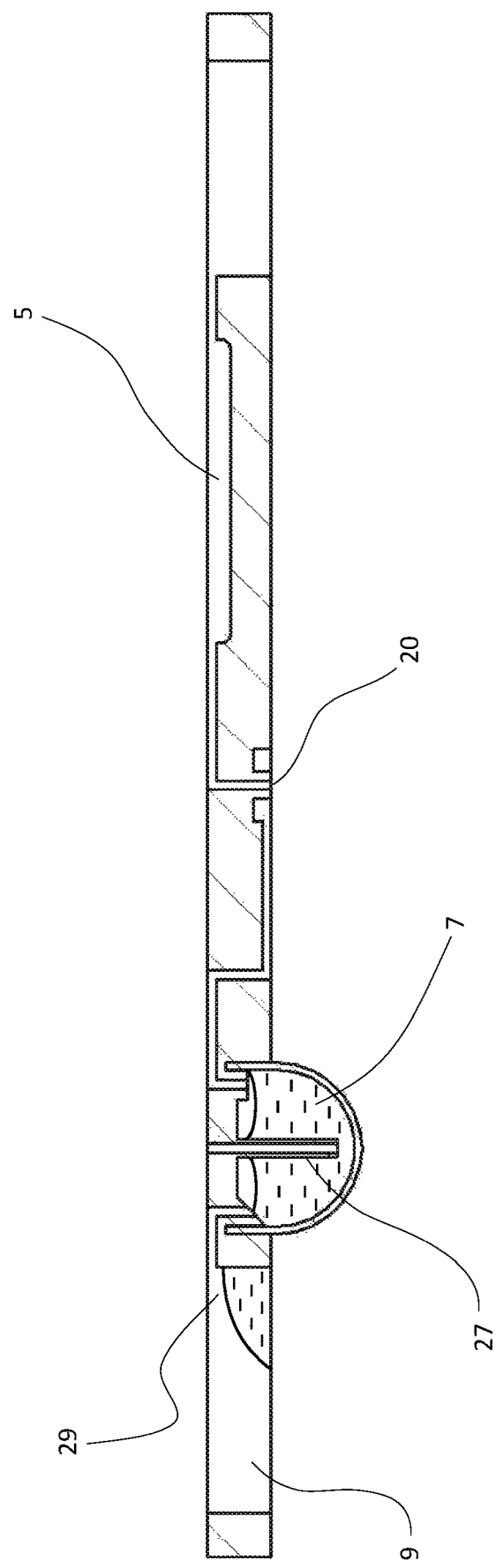
FIG. 8 shows a fluid manipulation cartridge incorporating a membrane valve element and improved intermediate fluid well.

The configuration described in FIG. 4 is included in this specification to illustrate the basic principles of operation in using pressure generated by sample entry to subsequently move sample through the device. FIG. 8 shows a particular arrangement of features for inclusion in a cartridge according to the invention, as implemented by the inventor. It shows a volume of liquid having been displaced from initial location 5 and being split into an aliquot retained in intermediate meter well 7 and the excess having travelled on to second overflow chamber 9. The design of second overflow chamber 9 is such that the liquid drops under gravity as it enters so that the exit 29 of secondary channel 8 remains clear of liquid. Additionally, a piece of wick material can be located within chamber 9 to draw liquid away from secondary channel exit 29. If membrane valve element 20 is then closed, there will be a residual pressure in the headspace of chamber 9 that is still elevated compared to its original level. In the configuration shown in FIG. 8, a subsequent displacement process may occur, in which the previous outlet port 15 becomes the new inlet port and the dip tube 27 becomes the new outlet port. If the top of the dip tube is connected to a further chain of features, not shown in FIG. 8 (since they are out of the plane of the image), the pressure in the chamber 9 can drive the aliquot in the well 7 towards that new chain.

An aliquot taken from the initial volume of liquid 4 shown in FIG. 4 has thus been retained in well 7 where it may also have been processed in some way, such as by heating for example, and may thereafter be displaced to take part in subsequent processes.

Some of the features described in relation to FIG. 8 are utilised in well 255 in FIGS. 1-3 as described above. The tube 250 is equivalent to dip tube 27, extending into the interior of the well 255. Air pressure applied through channel 510 urges sample from well 255 upwardly through tube 250, into the new "chain" of features starting with channel 290, which takes the sample on (in the example described in association with FIGS. 1-3) to the meter well 310.

Whether is it necessary to spilt a volume into a separate aliquot as described above or to manipulate a volume without splitting, as described herein it is common throughout all embodiments of the invention to make use of a chamber, similar to the second chamber 9 above or meter overflow well 315 above, that becomes pressurised during a sequence such that the elevated pressure is then utilised to drive a subsequent step.

It will be appreciated that if such a chamber has a fixed volume V and initial pressure $P_1$, and if a volume of liquid v is transferred into it, its pressure will increase to a new value $P_2=P_1V/(V-v)$. The new pressure $P_2$ is a strong function of liquid volume v and is analogous to a relatively stiff, or high rate, spring. However, to drive subsequent steps in a highly controlled fashion, it is advantageous to provide a reservoir of air at a relatively constant pressure. Thus it is preferable to provide an air reservoir that is analogous to a softer, lower rate, spring. To achieve this, the inventors have found it is very beneficial to make a portion of the wall of any such chamber flexible with suitable stiffness characteristics, for example for a section of the chamber walls to be in the form of a flexible bellows with the addition of a low rate mechanical spring exerting a force to generate the desirable internal pressurisation characteristics. This principle is illustrated in FIG. 6b, and described in the corresponding text below.

The process represented by FIG. 8 described above illustrates a segment of one of several processes implemented by the inventor for sample preparation prior to DNA amplification and detection. In this first embodiment the liquid volume 4 represents a biological sample that can be metered into a smaller aliquot (of more accurately controlled volume) and/or heated in well 7 to lyse certain micro-organisms present before being transferred during the second step of the process via the outlet port dip tube 27 to a further well where it is mixed with specific amplification reagents and heated a second time to amplify the target DNA, prior to being transferred to a subsequent detection system. In other applications, the DNA amplification and detection may be replaced with an immuno-diagnostic detection step, for example.

In certain detection systems for micro-organisms there is a need to concentrate the sample, usually involving binding the target constituents onto a solid-phase material that has a suitably activated surface. Once the target is bound onto the solid-phase, the excess sample material can be removed to waste. The bound target sample matter can then be washed by passing a suitable wash fluid through or over the solid-phase material. It can finally be eluted with an elution liquid for transfer to subsequent steps of the process.

The solid-phase material can take the form of a porous pad, frit or membrane located in a specific location, such as in a well. The necessary sequence of liquid volumes or aliquots that need to come into contact with the solid-phase, starting with the sample and proceeding through any wash steps, to the elution step, can be made to pass over or through it by means a sequence of air driven steps, as described above.

In certain instances is it advantageous for the solid-phase material to be in the form of small beads with activated surfaces, so designed to bind the target matter. Furthermore, the beads can be magnetic so that they can be retained at a specific location by means of an applied magnetic clamping field when they might otherwise be carried away by liquids passing over them, for example.

Figure 9A:
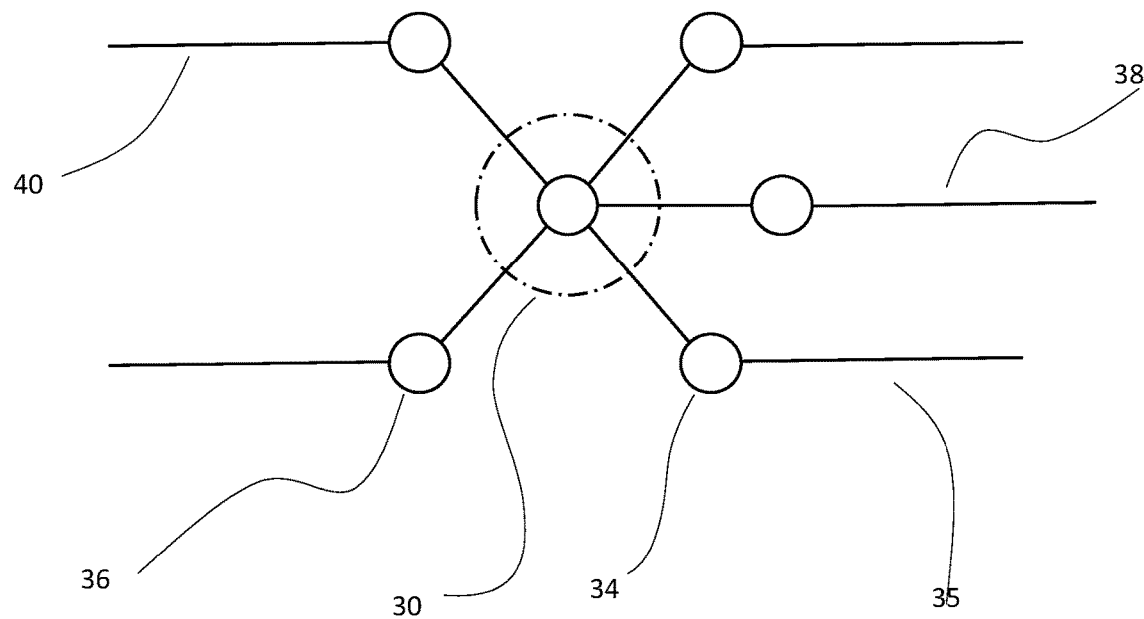
FIGS. 9A and 9B show features of the cartridge enabling one example of a sample concentration step utilising a high strength magnet.
Figure 9B:
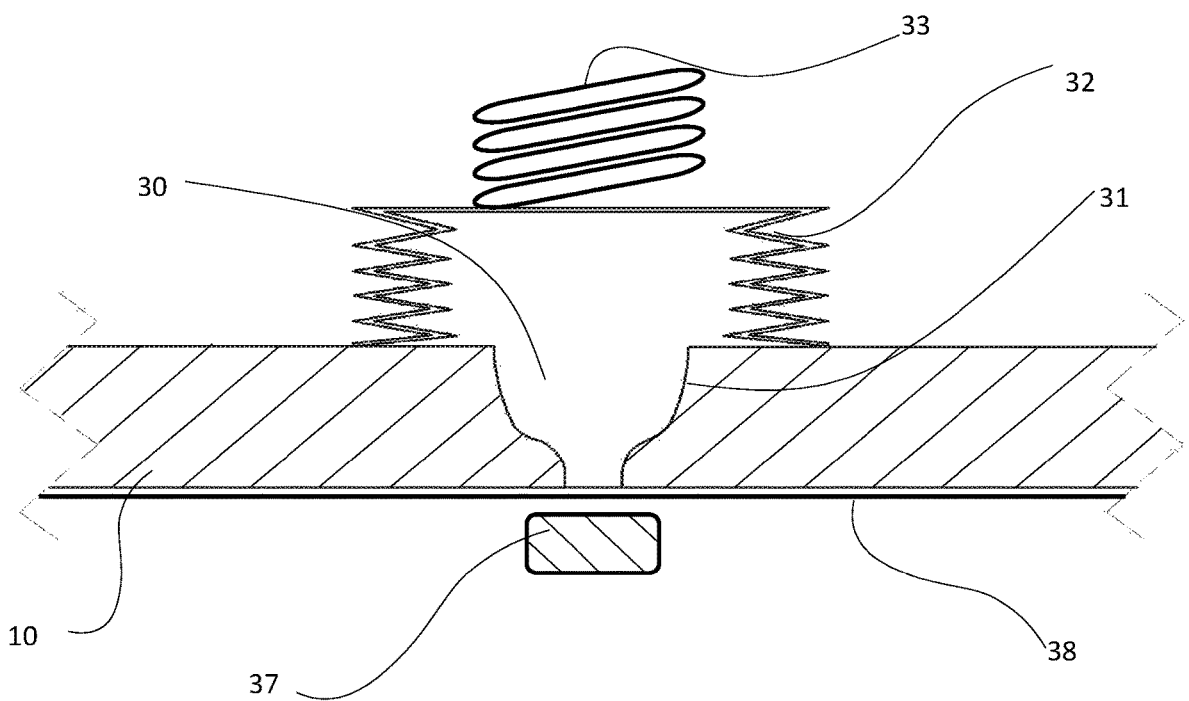

One embodiment of such an approach is shown in FIGS. 9A and 9B. FIG. 9A shows the topographical arrangement of liquid flow channels radiating into and out of a junction or sample accumulating region at the base of a sample processing chamber 30. FIG. 9B shows the sample processing chamber in cross-section.

In cross-section, the sample processing chamber 30 can be shaped to resemble a wine glass, and may initially have the magnetic beads dried onto the internal surfaces 31. The top portion of the chamber may be in the form of a flexible bellows 32 with an external spring 33 for the reasons of achieving relatively constant driving pressure explained above. The spring 33 can be part of the cartridge in which the features are formed or it can be applied externally when the cartridge is inserted into a controller device.

Referring to FIG. 9A, if a valve 34 in channel 35 is opened and a liquid initial sample volume is allowed to flow into sample processing chamber 30, the bellows will expand to accommodate the volume, but also to create an internal pressure that remains when valve 34 is closed. The sample re-suspends the magnetic beads retained on inner surface 31 of the chamber.

Before another valve, such as valve 36 leading to a waste reservoir, is opened an electromagnetic solenoid actuator (not shown) brings a high-strength rare earth permanent magnet 37 into contact with the membrane wall 38 forming the underside closure of the substrate 10. The field strength inside the base of the reservoir is sufficient to trap the beads when a valve is opened and the liquid allowed to flow out, thus creating a bead-trap. The rare earth magnet is retracted before the next volume of liquid, such as a wash buffer from channel 38 is allowed to flow in, causing the beads to be re-suspend.

The inventor has found that in small diagnostic systems it is not practical to generate sufficient field strength by means of a fixed electromagnet alone, so it is preferable to physically move a high strength magnet into and out of position as described.

The above described steps can be repeated a number of times. On the final step however, the last liquid to re-suspend the beads is an elution buffer that causes the target matter of interest to be released from the surface of the beads, before transferring it down channel 40 to subsequent processing steps such as DNA amplification and detection. The beads may again be trapped, such as in the manner described above, to avoid them being conveyed into the subsequent process steps, but in some detection systems the presence of the beads is not detrimental and so capturing them is not necessarily essential.

It will be appreciated that the location of the magnetic bead-trap can be at other locations than directly under the sample processing chamber, such as at an appropriate location in one of the fluid channels.

FIG. 10 shows a membrane valve element 20 arranged with the elastomeric membrane 21 positioned in such a way that the opening 22 is obstructed, thus the valve is closed. The controller unit that controls the processes performed on the cartridge comprises one or more valve actuators 101 comprising a force-transmitting element 102, in this case a ball, in a guide 103 that constrains its movement to be generally aligned to the axis of 'via' hole 23. Valve actuator 101 comprises an electromagnetic solenoid unit 655 with a flexible leaf 104 that is so formed to generate a force that biases force applying member 102 in its permitted direction of movement towards the membrane 21, thereby closing the valve element. Passing a current through the coil 105 causes the air gap 106 to close and the flexible leaf to be forced against the core 107 of the solenoid.

Membrane valve features and valve actuators according to the designs described above do not constitute fully functional valves until a cartridge containing a valve feature is inserted into a controller (also referred to herein as a carriage unit) containing a corresponding valve actuator. Suitable alignment details, such as dowel pins that engage into corresponding holes, are provided in the cartridge and controller to ensure the correct alignment of valve element and actuator following cartridge insertion.

Prior to cartridge insertion the valve features in the cartridge are in an open configuration, but become valves of the normally-closed type upon insertion into a controller. This change in the valve's status that is affected by cartridge insertion can be exploited to allow fluid movement prior to insertion, but to prevent it and/or control it following insertion.

Furthermore, valves according to this design have very low power consumption if they only need to be open for short periods of time. This is highly advantageous where there is a design objective to keep the overall power consumption of the device to a minimum.

Furthermore, once air gap 106 has closed in order to open the valve, such electromagnetic solenoids require very little power to maintain that status. Hence the total power consumption can be further reduced to hold the valve open. This power reduction can be achieved by a technique such as pulse wave modulation (PWM), or if a drive circuit of lower power output capacity is employed, by the use of an electronic charge pump to provide a relatively high current pulse for typically less than 100 milliseconds.

Figure 11:
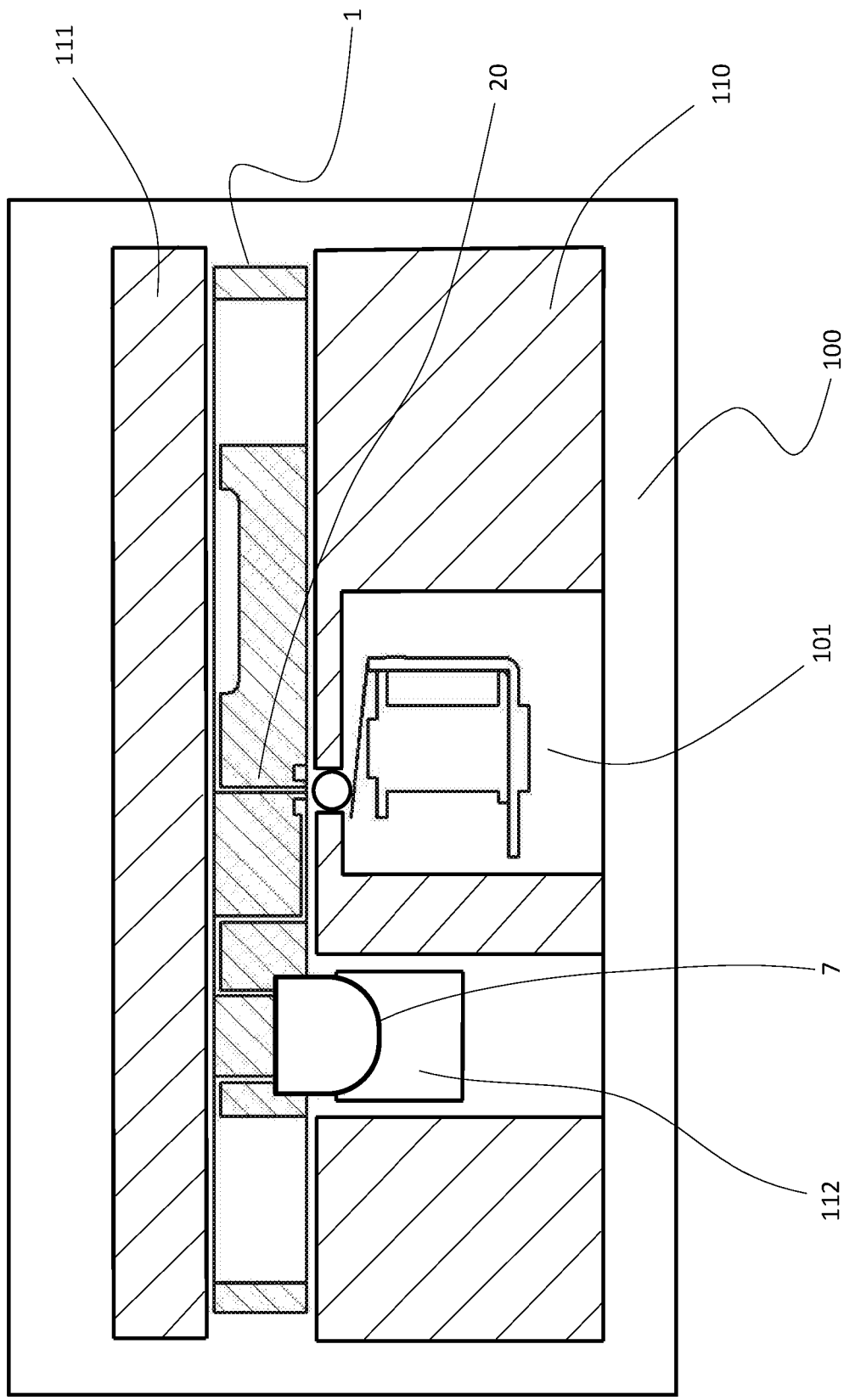
FIG. 11 shows a fluid manipulation cartridge inserted into a controller mechanism.

FIG. 11 illustrates a representative cartridge 1 generally as described above inserted into a controller or carriage unit 100 with upper and lower jaws 110 and 111 respectively clamped onto opposing faces of the cartridge. Lower jaw 110 includes a valve actuator element 101 to operate valve element 20 in cartridge 1 and a heater block 112 to heat liquid trapped in intermediate well 7.

Figure 12:
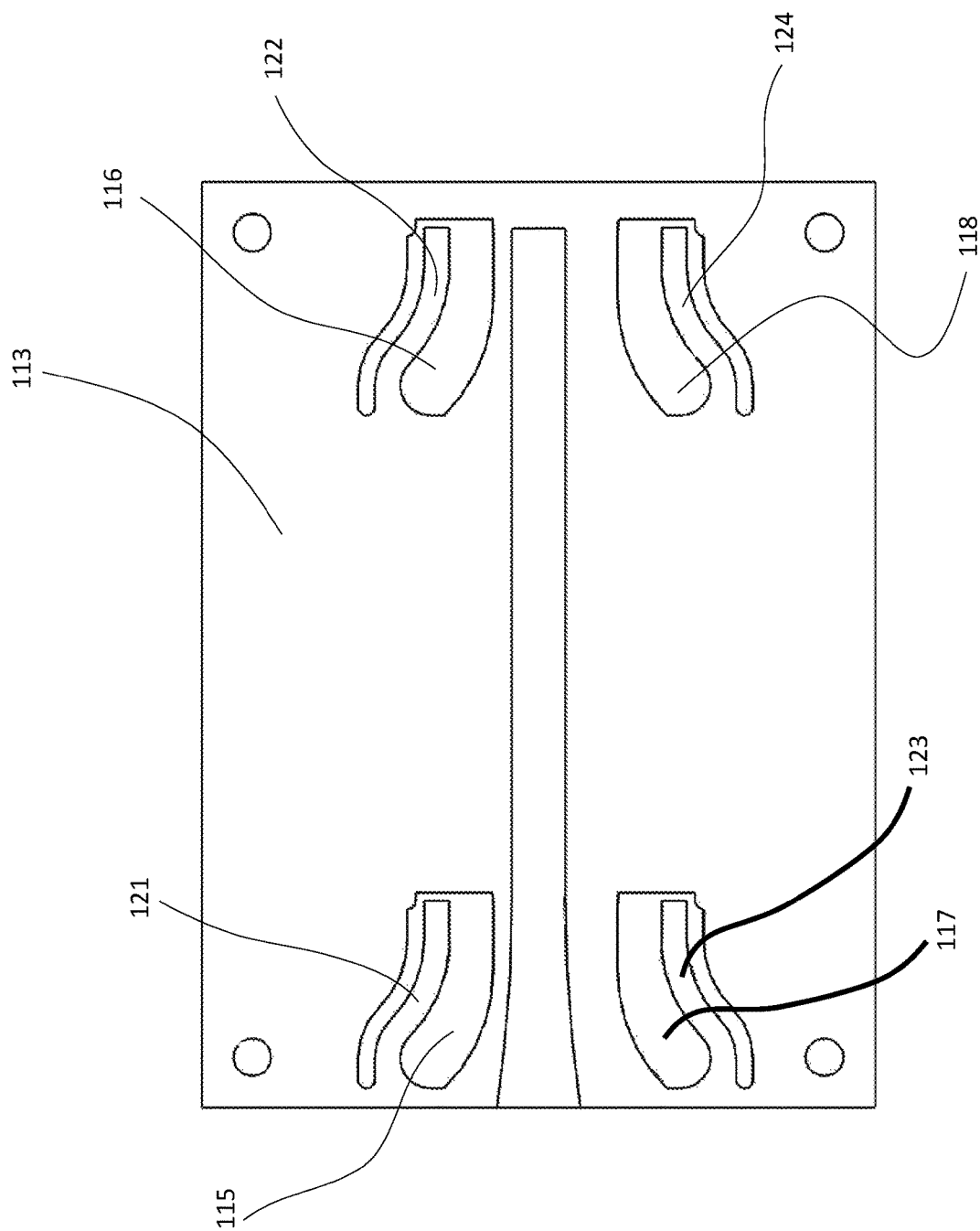
FIG. 12 shows a side plate of a controller mechanism.

FIG. 12 shows the design of one of two side frames 113 and 114 used in the controller. Guide slots 115, 116, 117 and 118 guide pegs on the side faces of the upper and lower jaws, thereby constraining the jaws, which are initially open before a cartridge is inserted, to describe an arc-like motion as the cartridge is inserted. The jaws are hence made to converge and clamp onto the cartridge as shown in FIG. 11. During insertion, the direction of motion of the jaws relative to the cartridge is generally orthogonal thereby readily facilitating the engagement of functional entities, such as valve actuators and heaters previously described, with the corresponding features in the cartridge.

Similar motion and clamping action can be achieved by mounting the jaws on link arms such that each side frame incorporates two four bar linkages (one for each jaw).

In the inventor's designs, it has also been found very beneficial to make either one or both of the jaws compliantly mounted so that the clamping force imposed on the cartridge is moderated in order to be sufficiently high for good operation of the functional elements, but not so high that insertion of the cartridge is excessively difficult. Spring fingers (121, 122, 123, 124) can be seen within the slots (115, 116, 117, 118). Certain functional elements can also be independently sprung within the jaws; heaters, for example, depend on good thermal contact and for these, additional control over the contact forces can be critical.

In addition to the valve actuators and heaters described above, the range of functional elements in the controller jaws that can engage with corresponding features in the cartridge can also include, for example: motor driven actuators to displace liquids; electromagnetic solenoid actuators that position strong permanent magnets against the cartridge surface, as described in relation to FIGS. 6a and 6b to trap magnetic beads at specific locations for example; temperature sensors; optical sensors; electrical contact pins, to connect to further devices embedded within the cartridge, such as small more localised heaters; pressure sensors; resistive or electrochemical sensors; or any other of a wide range of possible options. In all of these examples the relative orthogonal motion of the jaws to the cartridge surfaces is beneficial as it provides for direct engagement.

Figures 13A, 13B:
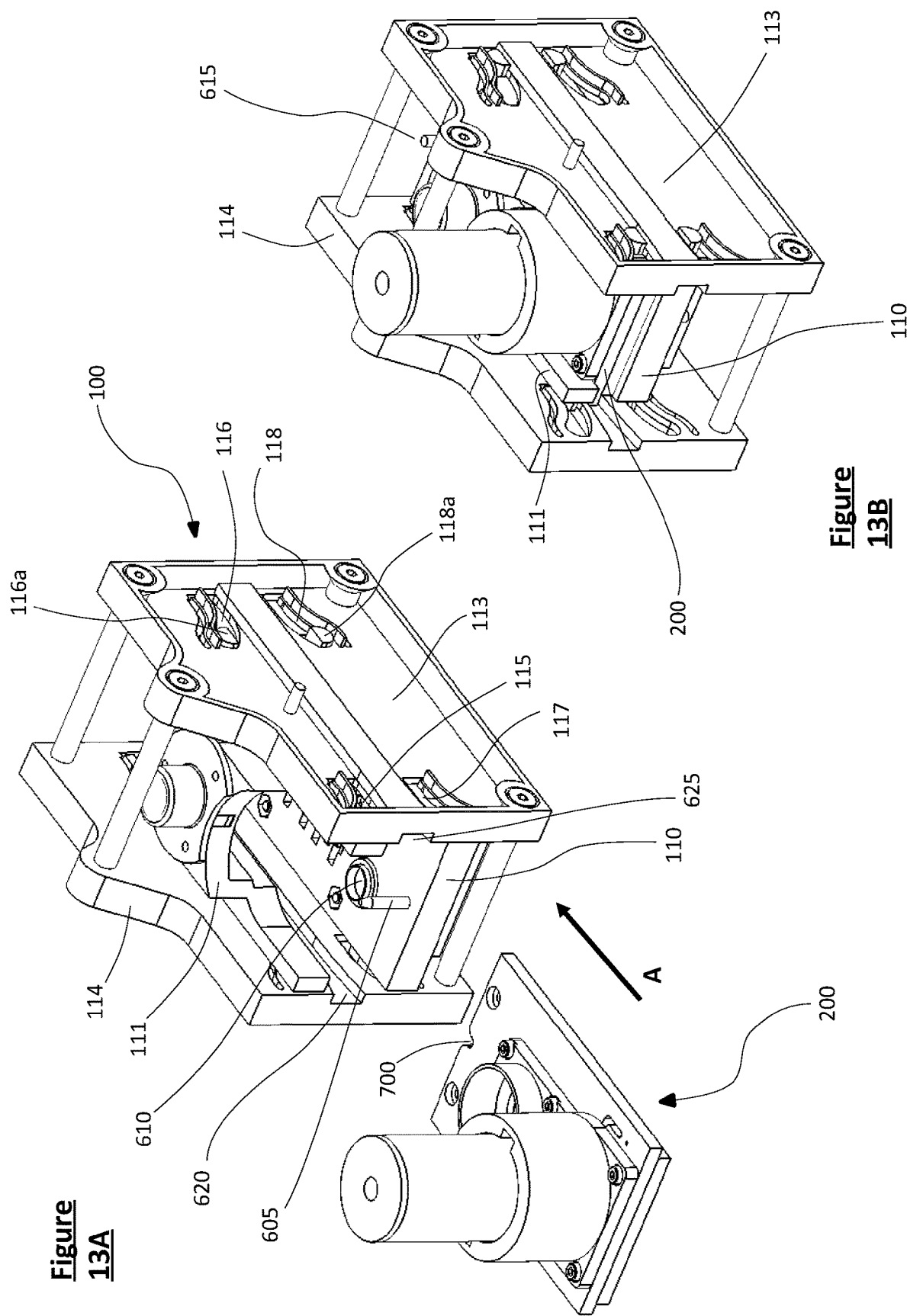
FIG. 13 shows a cartridge and controller mechanism (i.e. with no external casework visible) separated and ready for engagement (FIG. 13A) and engaged and in the cartridge processing position (FIG. 13B)

FIG. 13A shows a cartridge 200 as described above in relation to FIGS. 1-3, ready for engagement with a carriage unit or controller 100. Lower jaw 110 and upper jaw 111 are separated and awaiting engagement with the cartridge 200, i.e., the carriage unit is in a cartridge receiving position. Guide peg 116a, formed on the side of upper jaw 111, is visible in engagement with the slot 116. Likewise, guide peg 118a, formed on the side of lower jaw 110, is visible in engagement with the slot 118. There are also guide pegs 115a and 117a are engaged with slots 115 and 117, but are not visible in FIG. 13A. The skilled person will appreciate that there are equivalent features on the other side of the device, facing away from the viewer of FIG. 13A, but one of which is visible as 600 in FIG. 14. As described above, the engagement of the pegs facilitates the clamping motion of the jaws onto the cartridge when the cartridge is engaged with the carriage unit in the direction of the arrow A.

FIG. 13B shows the carriage unit 100 in the cartridge processing position, with the cartridge 200 having been engaged with the carriage unit 100 and moved forward in the direction of the arrow A, thereby causing the jaws 100 and 111 to clamp against the cartridge 200 as a result of the forward motion of the guide pegs in the slots 115, 116, 117 and 118. This is facilitated by engagement of recess 700, formed by the material of the first body 205 and second body 215 of the cartridge 200 and visible in FIGS. 1-3 and 13A, with a peg 615 formed at the front end of the carriage unit Other features of the carriage unit or controller 100 observable in FIG. 13 are side slots 520 and 625 formed on the interior surface of side frame 114 and 113, respectively, which serve as cartridge engagement features to facilitate correct location of the cartridge 200 within the carriage unit 100, prior to urging the carriage unit into the cartridge processing position shown in FIG. 13B. Also observable is a compressed air nozzle 605, connected to a source of compressed air not visible here, which is engaged with the port connection 520 shown in FIG. 3B when the carriage unit is in the cartridge processing position. In addition, well receiving position 610 is visible, designed for engagement with well 255 when the cartridge 200 is engaged with the carriage unit 100 in the cartridge processing position shown in FIG. 13B.

FIG. 14 shows an upper perspective (FIG. 14A) and a lower perspective (FIG. 14B) view of the lower jaw 110 of the carriage unit or controller 100. As mentioned above, well receiving position 610 is shown, with a further well receiving position 630 designed for engagement with amplification well 270 when the cartridge 200 is engaged with the carriage unit 100 in the cartridge processing position shown in FIG. 13B. Both well locating positions 610 and 630 are connected to heating elements (not visible) integrated within the material forming the receiving positions on the underside of jaw 110. These heating elements may be arranged to provide heat to the well when engaged within the well receiving position, when the carriage unit is in the cartridge processing position.

FIG. 14A also shows valve actuators 640, 645 and 650, each of which is a ball 102 located in a guide channel 103 as described above in relation to FIG. 10. Valve actuator 640 is positioned to engage with valve seat 305 in the cartridge 200, valve actuator 645 is positioned to engage with valve seat 332a and valve actuator 650 is positioned to engage with valve seat 360a. Each valve actuator is controlled by a solenoid unit 655, as described above in relation to FIG. 11, which are visible on the underside of jaw 110 shown in FIG. 14B.

Another type of functional element in the jaws that can engage with the cartridge are force-exerting members that can mechanically disrupt certain features in the cartridge. Examples of such include puncturing, cutting or bursting membranes that by so doing allow regions of the cartridge that had hitherto been separated to become interconnected. This is particularly advantageous where it is necessary to store dried reagents in regions of the cartridge in which they are protected from moisture ingress, originating for example from wet reagents stored elsewhere in the cartridge. A continuous or semi-continuous metallic enclosure, such as an aluminium foil pouch, may enclose those parts of the cartridge where sensitive reagents are stored, and by creating openings in the foil at or prior to the time of use, wet reagents can be allowed to flow and mix with said dried reagents. In this situation said force-exerting members may either include pointed or relatively sharp features to effect said puncturing, or may act upon separate components that include pointed or relatively sharp features. The latter may be part of either the cartridge or controller, however, it is beneficial for the functional elements included in the jaws to cause the necessary relative movement of such pointed or sharp features to puncture the membrane and establish the necessary flow paths.

Figure 15A:
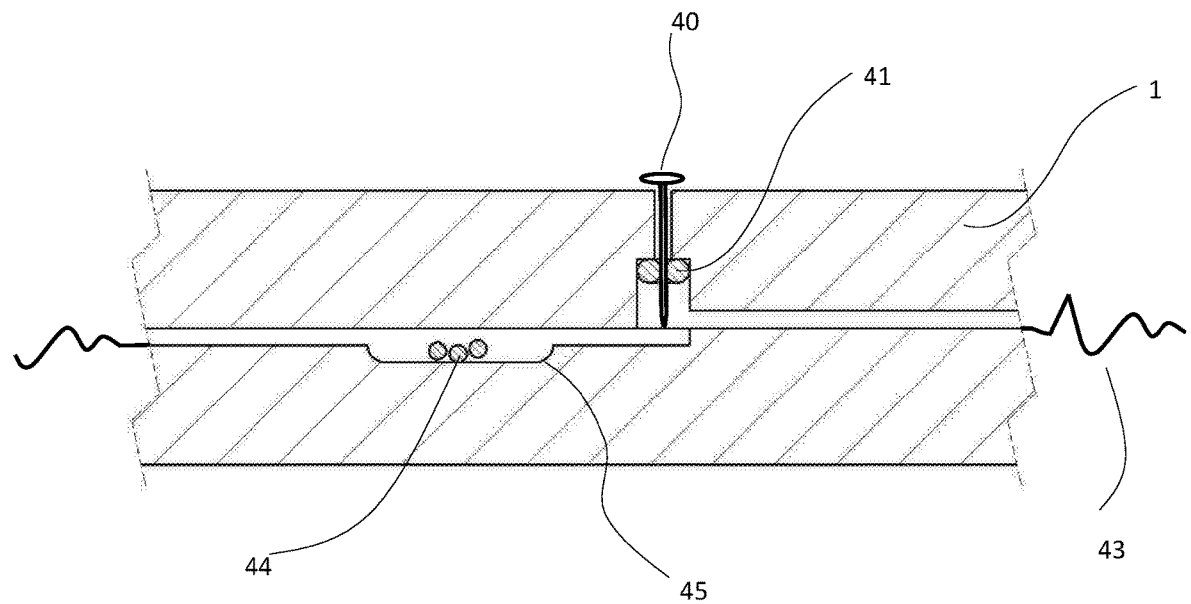
FIGS. 15A and 15B show alternative approaches to methods for mechanically disrupting a protective barrier in a fluid manipulation cartridge, by way of a pin valve.
Figure 15B:
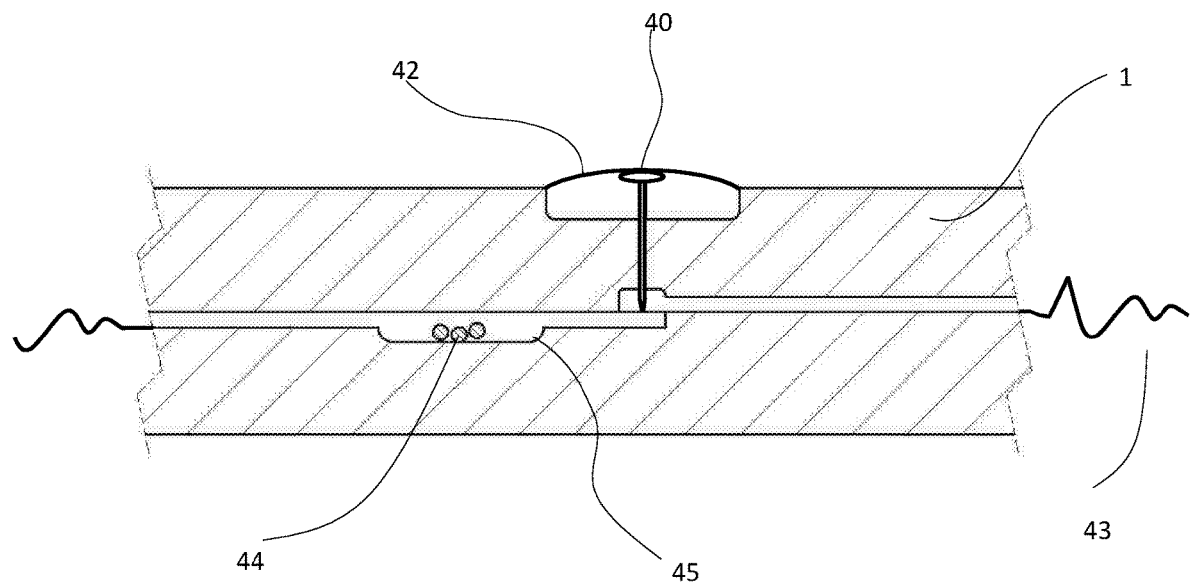

Two specific example of the latter are shown in FIGS. 15A and 15B where a small pin 40 is formed as an integral part of cartridge 1. The pointed end of the pin is sealed from the external environment either by a seal 41 or a flexible membrane 42 but can slide therein in order to puncture the metallic foil 43 extending between two layers of the cartridge that encloses dried reagents 44 stored in a specific reservoir 45 within the cartridge. It will also be seen from FIG. 10 that when the pin punctures foil 43 the flow paths on either side of the membrane come into fluidic connection, having previously been separated. Upon insertion into the controller, a force-exerting member therein depresses the pin as the jaws clamp onto the cartridge, causing foil 43 to be punctured. This arrangement of features is the feature referred to as a "pin valve" elsewhere in this specification.

The supply of compressed air necessary to drive the transport of fluid volumes within the cartridge can be provided by a small compressor contained in the controller. This may have an accompanying air reservoir to store air and to dampen out any small pressure fluctuations that may result if the compressor were connected directly to the cartridge. As the cartridge is inserted, the clamping action of the jaws is again beneficial as it allows an air supply nozzle in the controller to engage into an air receiving port in the cartridge.

Figure 16:
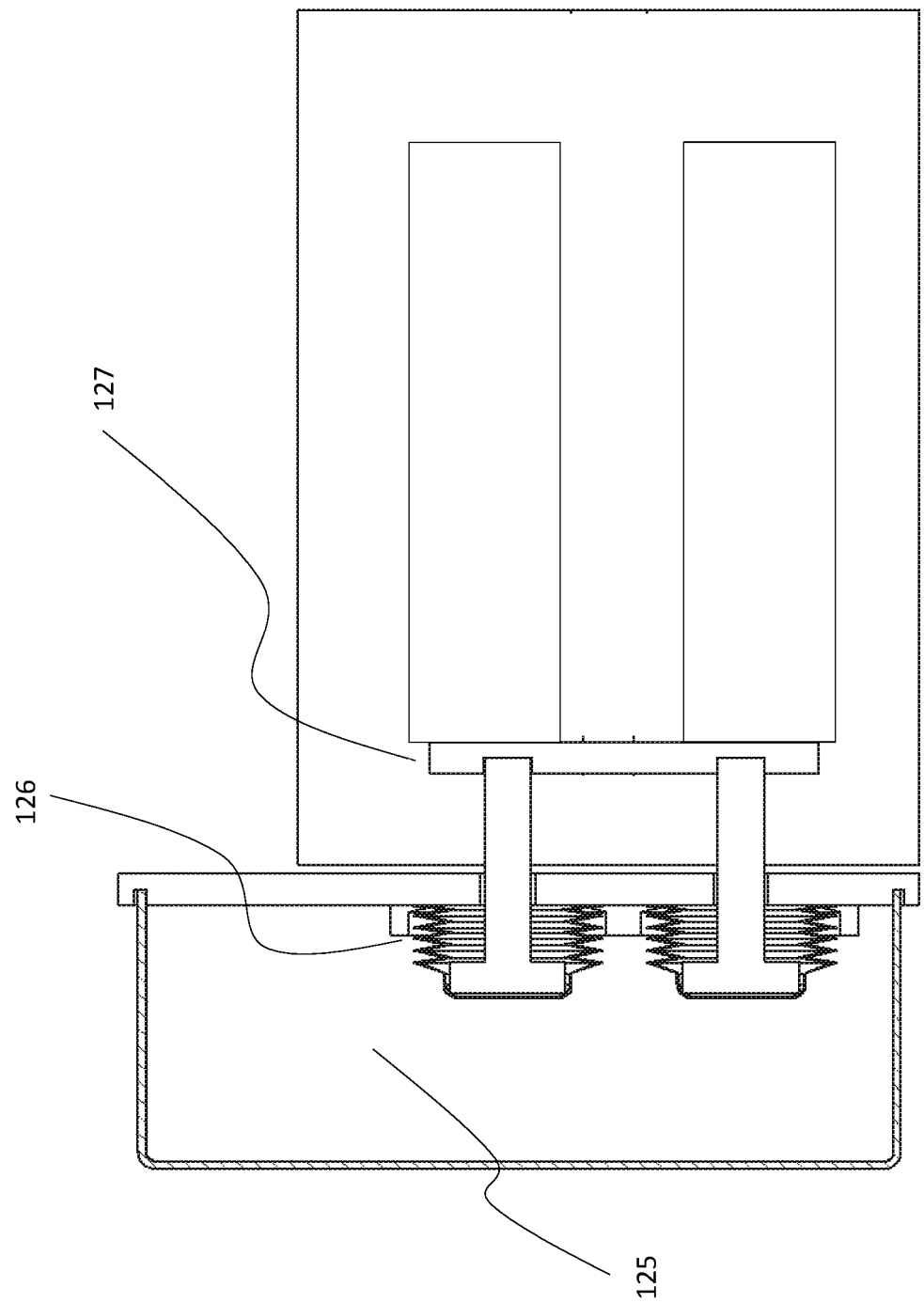
FIG. 16 shows a first configuration of compressed air reservoir for use either on-board a fluid manipulation cartridge or in the controller.

To minimize the cost and complexity of the controller, however, it is advantageous if the air compressor can be avoided. As illustrated in FIG. 16, this can be achieved if the air reservoir 125 includes a flexible portion 126, such as a bellows, that is depressed by a suitable contacting element 127 during the motion associated with insertion of the cartridge. This approach makes use of energy supplied by the user during the cartridge insertion action, and as described above, since the pressure necessary to drive the processes on the cartridge is relatively low, this can be achieved without the user being aware of any significant additional effort. It will be appreciated that, unlike most of the previously described features that take advantage of the orthogonal motion of the jaws relative to the cartridge, the configuration illustrated in FIG. 11 takes advantage of the motion of the jaws parallel to the insertion direction of the cartridge.

Figure 17:
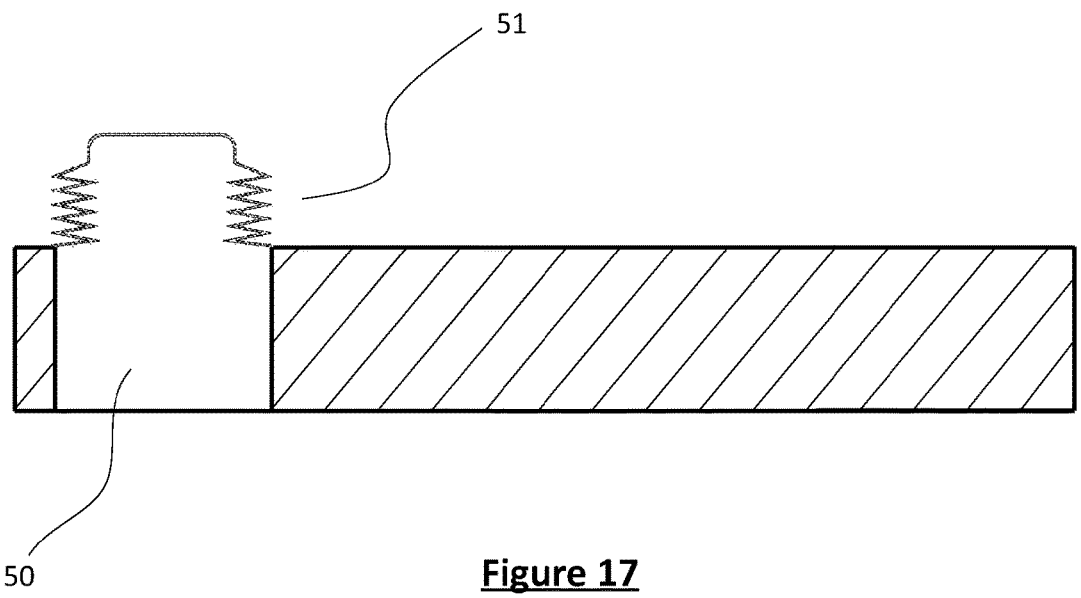
FIG. 17 shows a second configuration of compressed air reservoir on-board a fluid manipulation cartridge.

It will further be appreciated that an air reservoir 50 could alternatively be integral to the cartridge, as shown in FIG. 17, in such a way that it contains a flexible portion 51, such as a diaphragm or bellows, which is depressed during cartridge insertion. In this arrangement, the depression could be effected by a member attached to one of the upper or lower jaws, in which case it would utilise motion orthogonal to the insertion direction. Alternatively in a different design it could be depressed by a member attached to one of the frames, in which case it would utilise motion parallel with the cartridge insertion direction.

Figure 18:
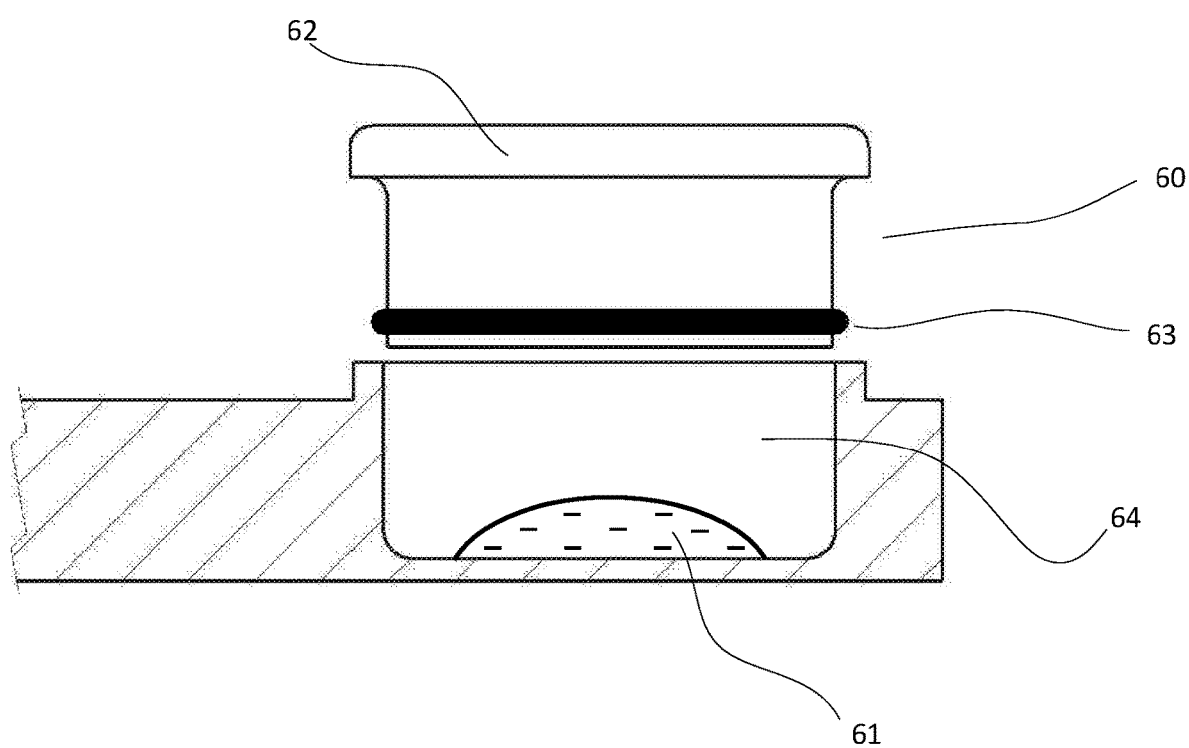
FIG. 18 shows a sample entry port and associated cap.

In a further alternative approach, illustrated in FIG. 18, a sample inlet port 60 is provided through which a user can load a sample 61 to be processed on cartridge 1. A cap 62 incorporating a seal 63 is also provided, that, in addition to preventing the sample from escaping, allows the cap to be further engaged into inlet port 60 and in so doing compresses the headspace volume 64 above the sample. Similar to the methods described above, this utilises the user's input energy to create a volume of air at elevated pressure that can be used to drive the motion of liquid volumes through networks of fluid control features within the cartridge.

Figure 19:
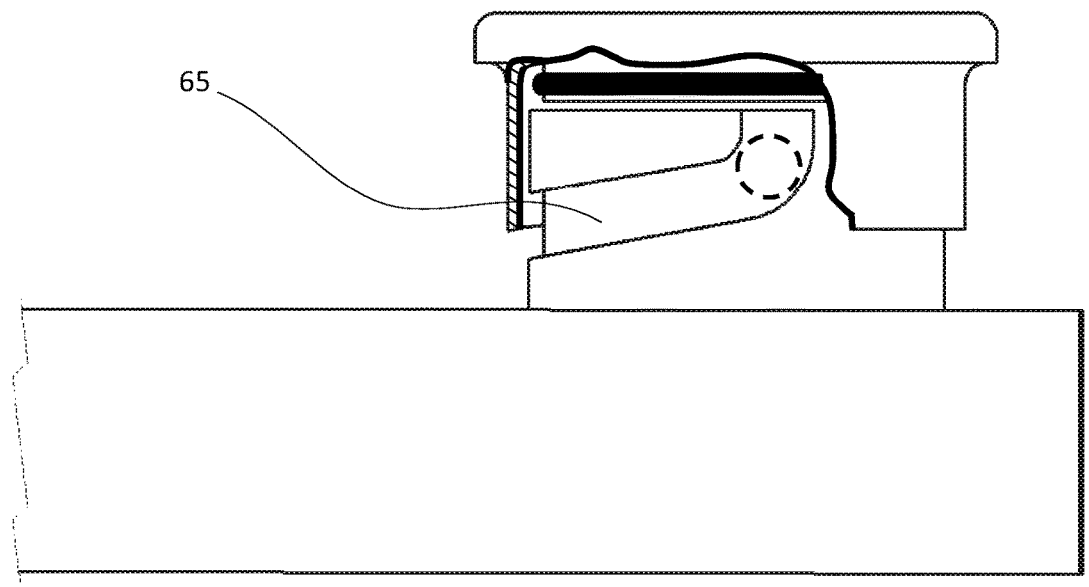
FIG. 19 shows the port and associated cap of FIG. 18 with a bayonet mechanism.

It is additionally advantageous for the engagement of the cap into the inlet port to be controlled by a mechanism such as a screw thread or a bayonet fitting. The latter of which, a bayonet 65, illustrated in FIG. 19, has the benefit of simplicity of action and pre-determined travel distance so that the resulting pressure in the headspace is controlled by the geometry of the mechanism and is thus not susceptible to variability between users.

Figure 20:
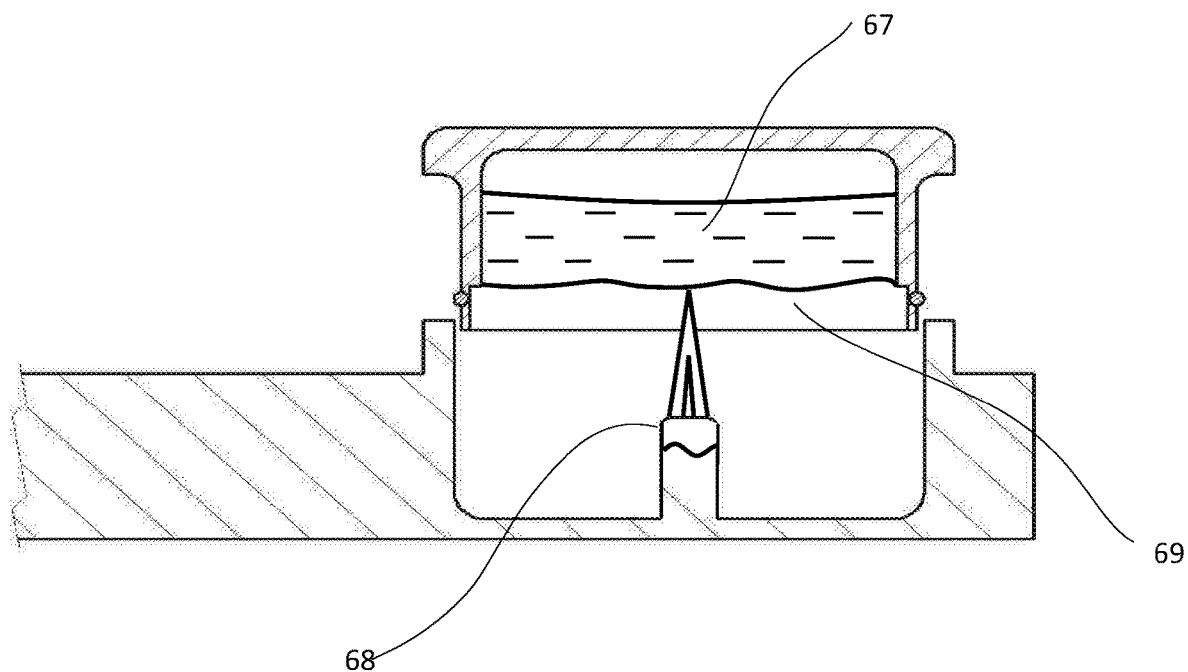
FIG. 20 shows a sample entry port and associated cap with an integral fluid reservoir.

As shown in FIG. 20, the cap may also contain a reservoir of fluid 67 that is released at or soon after the cap seals against the walls of the inlet port 60. This can be achieved in several ways such as a valve that is opened by a feature located inside the inlet port, or as illustrated in FIG. 20, by a spike 68 that causes a membrane wall 69 of reservoir 67 to be punctured.

Figure 21:
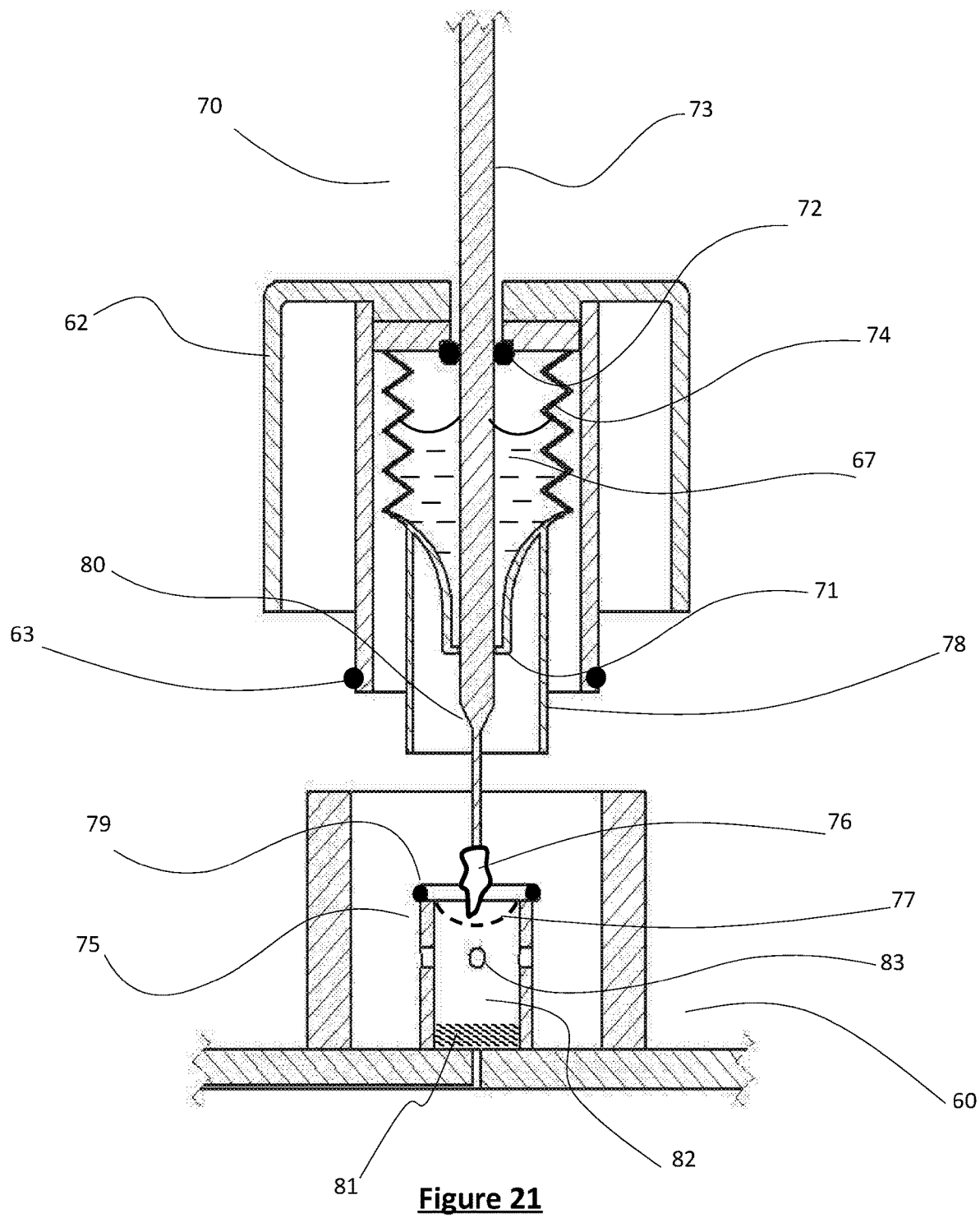
FIG. 21 shows a sample entry port and associated cap with integral reservoir and sample collection swab.

FIG. 21 shows a variation of this embodiment that also contains a swab 70 used for collection of viscous or semi-solid samples for introduction into the sample inlet port. The swab passes through proximal and distal seals (71, 72 respectively) in reservoir 67 that both seal onto the shaft 73 of the swab. The side walls of the reservoir are formed as a flexible bellows 74. A receptacle 75 for receiving the swab head 76 is located inside the sample inlet port 60; this contains a perforated sieve (77).

When collecting a sample of material with the swab, the reservoir would ordinarily be located at the proximal end of shaft 73 such that swab head 76 is protruding in a manner suitable for sample collection. Once a sample has been collected, the user inserts swab head 76 into receptacle 75 and slides the cap/reservoir down shaft 73 to engage it into inlet port 60. As above, the cap also contains a mechanism such as a screw thread or preferably a bayonet fixing to control the distance of engagement of the cap into the inlet port (not visible in FIG. 21). As the cap 62 approaches the inlet port 60, a protrusion 78 of the reservoir engages against a face seal 79 located in the rim of receptacle 75, and the force provided by the user, facilitated by the bayonet fixing, causes the bellows to begin to compress, thus increasing the internal pressure in the reservoir. At about the same time a region 80 of reducing cross-sectional area in swab shaft 73 passes through distal seal 71 allowing the reservoir's contents to be released; the increased internal pressure causes this release to be sufficiently vigorous to wash swab head 76. As the bayonet fitting continues to advance cap 62 into inlet port 60, reservoir 67 is further compressed and the contents continue to flow over the swab head under pressure. The contents mix with the sample matter and flow through the sieve 77 and into the collection chamber or sample inlet well 81. Sieve 77 has an initial coarse filtering action, but a second filter 81 can also be located in the base of collection chamber or inlet well 82 to separate further solid matter from the sample.

As cap 62 is driven by the bayonet or screw mechanism, cap seal 63 engages into inlet port 60. Its further travel compresses headspace 64 which communicates with collection chamber 82 by means of radial holes 83. This volume of air at elevated pressure thus constitutes an example of first chamber 3 to drive the sample through filter 81 and into a first chain of fluid features within the cartridge.

Radial holes 83 may be omitted in an alternative design variation, in which case the air headspace is divided into two volumes, a first of smaller capacity above the sample that drives it via suitable channels to a working location, and a second of larger volume that communicates via different channels that can constitute first chamber 3 to one or more separate chains of fluid features. If the first volume of the headspace above the sample has small or negligible capacity, the process of driving the sample is at or near hydraulic conditions and this can be advantageous if high resistance may be encountered through filter 81.

Figure 22:
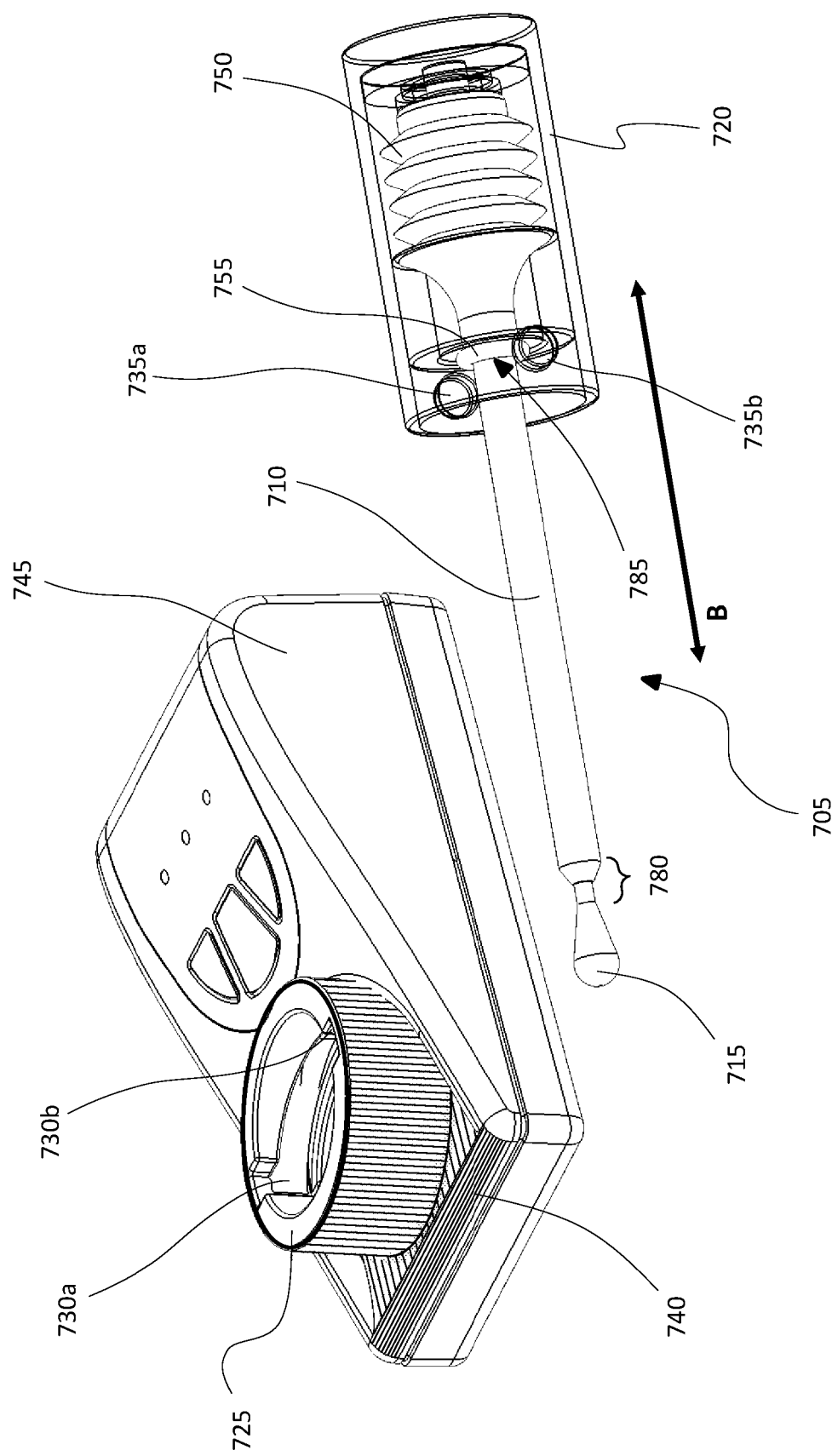
FIG. 22 shows a sample collection swab and an example of a cartridge engaged with a controller, ready for engagement with the swab.

FIG. 22 shows a similar sample swab device, comprising a shaft 710 carrying a swab material 715 at one end. The lid element 720 is capable of engagement with a cartridge container 725 which comprises bayonet grooves 730a and 730b for engagement with bayonet pins 735a and 735b, respectively, positioned on the exterior of the lid 720. In FIG. 22, the container 725 is part of a cartridge 740 (indicated by shaded areas), which is shown engaged with a controller 745 and in the cartridge processing position. The lid 720 comprises an interior liquid reservoir 750 with walls formed as bellows. As described above, the reservoir comprises a protruding seal 755 which is in sealing relationship with the shaft 710 unless the lid is moved along the shaft in the direction of arrow B until the seal 755 is in region 780, where the shaft 710 narrows so that liquid in the reservoir 750 can exit. When the lid 720 is engaged with the container 725, the nose 785 of the reservoir can contact the top of a sub-container (not visible) inside container 725, compressing the bellows forming reservoir 750 and forcing liquid in the reservoir out more quickly. In use, as the shaft 710 is in a vertical orientation due to the engagement of the lid 720 with the container 725, this has the effect of washing liquid from the reservoir over any material collected on the swab material 715.

Figure 23:
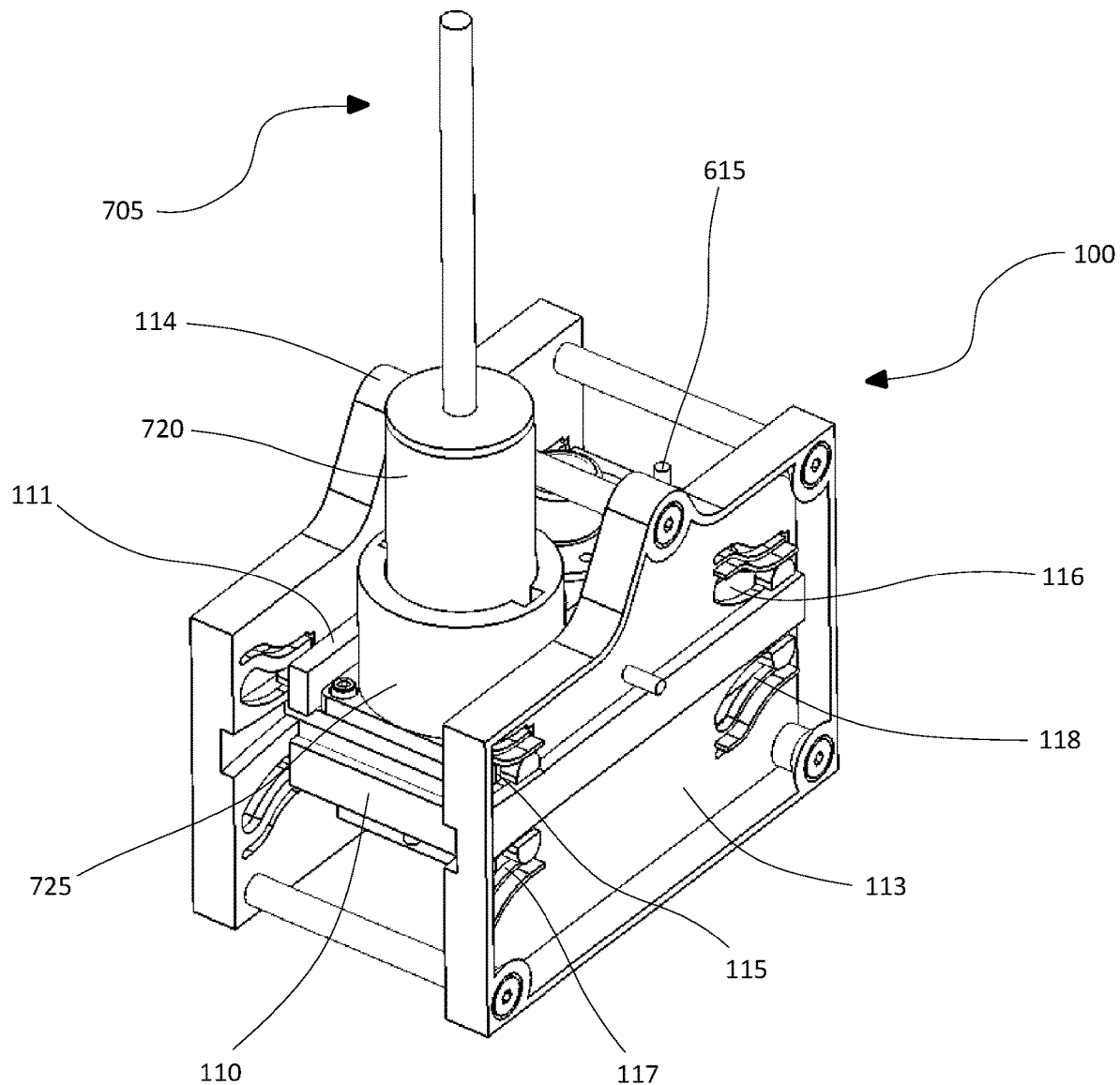
FIG. 23 shows a cartridge with an engaged swab, the cartridge engaged in a cartridge processing position with a controller mechanism.

FIG. 23 shows the swab device 705 of FIG. 22 with the lid portion 720 connected to the container 725 in a cartridge 740 engaged with a carriage unit as described above in relation to FIGS. 13 and 14.

It will be clear to the skilled person that the various elements exemplified with reference to the Figures are a sample of a number of combinations of features described herein, which might be combined in other ways in accordance with the summary of the invention provided above and in accordance with the claims. The detailed description provided herein should not be taken as an indication that the invention is limited to the particular combination of features described here.

The invention claimed is:

1. A sample processing cartridge comprising
   a) a sample entry location;
   b) a sample processing chamber;
   c) a sample analysis location comprising a sample analysis well;
   d) a first channel;
   e) a second channel, the second channel comprising a closed or closable second channel valve;
   wherein the sample processing chamber comprises a sample processing chamber port positioned in a sample accumulating region of the sample processing chamber,
   wherein the first channel and the second channel meet at a first junction, the first junction being connected to the sample processing chamber port,
   wherein the sample entry location is in fluid connection with the sample processing chamber via the first channel, the first junction, and the sample processing chamber port,
   wherein the sample processing chamber is in fluid connection with the sample analysis location via the sample processing chamber port, the first junction, and the second channel, and wherein the sample processing chamber is closed such that: when a sample liquid enters the sample processing chamber via the sample processing chamber port, it is not otherwise possible for liquid or gas to exit the sample processing chamber; and the only route through which said sample liquid may exit the sample processing chamber is from the sample accumulating region.

2. The cartridge according to claim 1 in which the first channel comprises a first channel valve.

3. The cartridge according to claim 1 wherein the sample processing chamber comprises a closed sample processing well which is at least partially formed to be expandable.

4. The cartridge according to claim 1 wherein the sample processing chamber comprises a meter well fluidly connected by a third channel to a meter overflow well.

5. The cartridge according to claim 1 wherein the sample analysis location further comprises a detection location connected by a fourth channel to the sample analysis well, wherein the detection location comprises a lateral flow device or a system configured to visualize or detect the presence of an analyte in a sample.

6. The cartridge according to claim 1 wherein the first channel comprises a primary first channel portion, a secondary first channel portion and a sample receiving well positioned therebetween, the sample receiving well optionally being connected to a sample overflow well by a fifth channel, the secondary first channel portion comprising a first channel valve.

7. The cartridge according to claim 5 further comprising a liquid-containing well connected by a sixth channel to the sample analysis well.

8. The cartridge according to claim 1 wherein the sample entry location comprises a sample receiving container in fluid connection with the first channel, the container having an interior and an entrance aperture.

9. The cartridge according to claim 8 wherein the container comprises a lid comprising a protruding distal portion which is formed to have has mating dimensions with at least a portion of the interior of the container; wherein the lid is sealingly connectable to the container via an interface configured to provide a progressive transition between open and closed configurations, further wherein, in the closed configuration, the protruding distal portion of the lid is in sealing contact with the interior of the container, whereby when the lid is urged into the closed configuration in use, fluid within the sample receiving container is displaced from said portion of the interior of the container.

10. A kit comprising:
    a cartridge according to claim 1; and
    a sample receiving container suitable for engagement with the cartridge at the sample entry location, the sample receiving container comprising a container having an interior, an entrance aperture and an exit aperture, and a lid comprising a protruding distal portion which has mating dimensions with at least a portion of the interior of the container;
wherein the lid is sealingly connectable to the container via an interface configured to provide a progressive transition between open and closed configurations, further wherein, in the closed configuration, the protruding distal portion of the lid is in sealing contact with the interior of the container, whereby when the lid is urged into the closed configuration in use, fluid within the sample receiving container is displaced from said portion of the interior of the container.

11. The kit according to claim 10, wherein the lid comprises one or more first interlocking features, the container comprises one or more second interlocking features, the first and second interlocking features being engageable to provide the interface between the lid and the container.

12. The kit according to claim 11 wherein the first and second interlocking features of the sample receiving container comprise a screw thread to provide a screw connection or a bayonet fitting to provide a bayonet connection.

13. The cartridge according to claim 1 engaged with a sample receiving container comprising a container having an interior, an entrance aperture and an exit aperture, and a lid comprising a_protruding distal portion which is formed to have mating dimensions with at least a portion of the interior of the container; wherein the lid is sealingly connectable to the container via an interface configured to provide a progressive transition between open and closed configurations, further wherein, in the closed configuration, the protruding distal portion of the lid is in sealing contact with the interior of the container, the sample receiving container being engaged with the cartridge at, wherein the sample receiving container claim 10 is engaged with the cartridge at the sample entry location so as to place the exit aperture of the container in fluid connection with the first channel of the cartridge.

14. A kit comprising:
    a cartridge according to claim 8; and
    a sample swab device suitable for engagement with the sample receiving container of the cartridge, the sample swab device comprising a container lid sealingly connectable to the sample receiving container, the lid comprising a first surface and an opposing second surface from which a protruding distal portion extends, the distal portion comprising a liquid reservoir having an open and a closed reservoir configuration;
the device further comprising a rod having a first end and a second end;
the rod being encircled by the protruding distal portion of the lid which extends towards the first end of the rod, the lid being moveable along rod between the first and second ends such that, when the protruding distal portion of the lid is positioned at the first end, the reservoir is in the open reservoir configuration and when the protruding distal portion of the lid is positioned away from the first end, the reservoir is in the closed reservoir configuration;
wherein the lid is sealingly connectable to the sample receiving container via an interface configured to provide a progressive transition between open and closed container configurations, further wherein, in the closed container configuration, the protruding distal portion of the lid is in sealing contact with the interior of the container.

15. The kit according to claim 14 wherein the liquid reservoir is formed within the distal lid portion as a compressible chamber having a reservoir base adjacent the lid second surface and a reservoir nose, the reservoir base and reservoir nose each comprising an annular opening in sealing engagement with the rod when the protruding distal portion of the lid is positioned away from the first end; wherein the reservoir nose is capable of engagement with the sample receiving container of the cartridge such that, in use, when the lid is connected to the sample receiving container in the closed configuration, the compressible chamber is compressed.

16. The kit according to claim 14 wherein the first end of the rod comprises a collection tool or material.

17. The cartridge according to claim 7 wherein the liquid-containing well comprises a fluid dispensing system comprising a storage chamber in fluid connection with a dispensing chamber, the dispensing chamber being sealed with a film to form a closed chamber configuration and comprising an integral pin moveable from a first position to a second film-piercing position, placing the dispensing chamber in an open chamber configuration, wherein the dispensing chamber of the fluid dispensing system is arranged to be in fluid communication with the sixth channel of the cartridge when the dispensing chamber is in the open chamber configuration.

18. The cartridge according to claim 8 engaged with a sample swab device, the sample swab device comprising a container lid sealingly connectable to the sample receiving container, the lid comprising a first surface and an opposing second surface from which a protruding distal portion extends, the distal portion comprising a liquid reservoir having an open and a closed reservoir configuration;
the device further comprising a rod having a first end and a second end;
the rod being encircled by the protruding distal portion of the lid which extends towards the first end of the rod, the lid being moveable along rod between the first and second ends such that, when the protruding distal portion of the lid is positioned at the first end, the reservoir is in the open reservoir configuration and when the protruding distal portion of the lid is positioned away from the first end, the reservoir is in the closed reservoir configuration;
wherein the lid is sealingly connectable to the sample receiving container via an interface configured to provide a progressive transition between open and closed container configurations, further wherein, in the closed container configuration, the protruding distal portion of the lid is in sealing contact with the interior of the container.

\* \* \* \* \*